United States Patent
Wang et al.

(10) Patent No.: US 10,484,918 B2
(45) Date of Patent: Nov. 19, 2019

(54) LOAD BALANCING IN WIRELESS NETWORKS FOR IMPROVED USER EQUIPMENT THROUGHPUT

(71) Applicant: AT&T INTELLECTUAL PROPERTY I, L.P., Atlanta, GA (US)

(72) Inventors: Huahui Wang, Bridgewater, NJ (US); Tae Won Cho, Jersey City, NJ (US); Gopalakrishnan Meempat, East Brunswick, NJ (US); Henry Kafka, Atlanta, GA (US); Ravi Raina, Skillman, NJ (US); Xiaoyu Wang, Watchung, NJ (US); Laurie Bigler, Lafayette, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 175 days.

(21) Appl. No.: 15/623,289

(22) Filed: Jun. 14, 2017

(65) Prior Publication Data

US 2018/0368037 A1 Dec. 20, 2018

(51) Int. Cl.
*H04W 36/06* (2009.01)
*H04W 24/08* (2009.01)
(Continued)

(52) U.S. Cl.
CPC ......... *H04W 36/06* (2013.01); *H04L 41/0816* (2013.01); *H04L 41/0896* (2013.01);
(Continued)

(58) Field of Classification Search
CPC .... H04L 43/0894; H04L 43/16; H04W 16/18; H04W 24/02; H04W 24/08; H04W 28/24
See application file for complete search history.

(56) References Cited

U.S. PATENT DOCUMENTS

| | | | |
|---|---|---|---|
| 8,179,866 | B2 | 5/2012 | Carlsson |
| 8,423,026 | B2 | 4/2013 | Iwamura et al. |

(Continued)

FOREIGN PATENT DOCUMENTS

| | | |
|---|---|---|
| CN | 103702376 A | 4/2014 |
| CN | 103702376 B | 3/2017 |

OTHER PUBLICATIONS

Checko, et al. "Cloud radio access network architecture. Towards 5G mobile networks." Diss. Technical University of Denmark (DTU), 2016. 171 pages.

(Continued)

*Primary Examiner* — Mohamed A Kamara
(74) *Attorney, Agent, or Firm* — Amin, Turocy & Watson, LLP

(57) ABSTRACT

Distribution of traffic to cells in a communication network can be controlled. A distribution management component (DMC) can determine overall device traffic throughput for cells of a sector that satisfy a defined traffic throughput criterion relating to a harmonic mean of the device traffic throughput for the cells to desirably enhance or maximize the harmonic mean of the overall device traffic throughput. Based on the overall device traffic throughput for the cells, the DMC can determine whether to adjust a characteristic associated with a cell of the cells to facilitate adjusting distribution of device traffic among the cells of the sector to achieve desirable load balancing of traffic by the sector and in the network. Load balancing can be achieved by controlling respective parameters with regard to communication devices that are in idle mode or connected mode to facilitate directing communication devices and associated traffic to desired cells.

20 Claims, 10 Drawing Sheets

(51) Int. Cl.
  *H04W 28/02*   (2009.01)
  *H04L 12/26*   (2006.01)
  *H04L 12/24*   (2006.01)
  *H04L 12/803*  (2013.01)
  *H04W 36/00*   (2009.01)
  *H04W 88/08*   (2009.01)

(52) U.S. Cl.
  CPC ........ *H04L 43/0888* (2013.01); *H04L 47/125* (2013.01); *H04W 24/08* (2013.01); *H04W 28/0205* (2013.01); *H04W 36/00837* (2018.08); *H04L 43/0876* (2013.01); *H04L 43/16* (2013.01); *H04W 88/08* (2013.01)

(56) References Cited

U.S. PATENT DOCUMENTS

| | | |
|---|---|---|
| 8,886,209 B2 | 11/2014 | Shaw et al. |
| 8,929,234 B1 | 1/2015 | Vivanco et al. |
| 8,942,636 B2 * | 1/2015 | Gupta ............... H04W 28/24 370/230 |
| 8,942,710 B2 | 1/2015 | Brisebois |
| 8,953,444 B2 | 2/2015 | Ghosh et al. |
| 9,055,501 B2 | 6/2015 | Ekemark |
| 9,226,180 B2 | 12/2015 | Chandrasekhar et al. |
| 9,277,449 B2 | 3/2016 | Wu |
| 9,277,470 B2 | 3/2016 | Laroia et al. |
| 9,307,428 B2 | 4/2016 | Bhatia et al. |
| 9,392,491 B2 | 7/2016 | Palat et al. |
| 9,432,881 B2 | 8/2016 | Zhang et al. |
| 9,510,240 B2 | 11/2016 | Lorca et al. |
| 9,526,031 B2 | 12/2016 | Siomina et al. |
| 9,544,159 B2 | 1/2017 | Nagata et al. |
| 9,565,577 B2 | 2/2017 | Kapnadak et al. |
| 9,572,070 B2 | 2/2017 | Brisebois et al. |
| 9,642,155 B2 | 5/2017 | Wijetunge et al. |
| 9,872,204 B2 | 1/2018 | Chan et al. |
| 2007/0274228 A1 * | 11/2007 | Nandagopalan ........ H04L 45/12 370/252 |
| 2009/0163223 A1 * | 6/2009 | Casey ................. H04W 36/22 455/453 |
| 2011/0045819 A1 | 2/2011 | Lee et al. |
| 2012/0106346 A1 | 5/2012 | Aguirre et al. |
| 2012/0263145 A1 * | 10/2012 | Marinier ............... H04W 36/22 370/331 |
| 2012/0314569 A1 | 12/2012 | Liu et al. |
| 2014/0269355 A1 | 9/2014 | Monogioudis et al. |
| 2015/0031360 A1 | 1/2015 | Choi et al. |
| 2015/0189533 A1 | 7/2015 | Fehske et al. |
| 2015/0264579 A1 | 9/2015 | Claussen |
| 2015/0312805 A1 | 10/2015 | Cui et al. |
| 2015/0312822 A1 | 10/2015 | Bangolae et al. |
| 2015/0358883 A1 | 12/2015 | Axelsson et al. |
| 2016/0021573 A1 | 1/2016 | Kant |
| 2016/0112902 A1 | 4/2016 | Huh et al. |
| 2016/0119813 A1 | 4/2016 | Sridhar et al. |
| 2016/0192239 A1 | 6/2016 | Salvador et al. |
| 2016/0192370 A1 * | 6/2016 | Chan ................... H04W 72/02 370/329 |
| 2016/0295459 A1 | 10/2016 | Bryson |
| 2016/0295572 A1 | 10/2016 | Hahn et al. |
| 2016/0277968 A1 | 11/2016 | Ekemark et al. |
| 2017/0289867 A1 | 10/2017 | Fan et al. |
| 2017/0332303 A1 | 11/2017 | Sunay et al. |
| 2018/0049030 A1 | 2/2018 | Manepalli et al. |
| 2018/0049267 A1 | 2/2018 | Chen et al. |
| 2019/0159078 A1 | 5/2019 | Wang et al. |

OTHER PUBLICATIONS

Office Action dated Nov. 28, 2017 for U.S. Appl. No. 15/596,457, 31 pages.

"LTE CA: Carrier Aggregation Tutorial" [http://www.radio-electronics.com/info/cellulartelecomms/lte-long-term-evolution/4g-lte-advanced-carrier-channel-aggregation.php] retrieved Feb. 17, 2017, 4 pages.

Office Action dated Aug. 21, 2019 for U.S. Appl. No. 16/004,133, 37 pages.

\* cited by examiner

LOAD BALANCING IN WIRELESS NETWORKS FOR IMPROVED USER EQUIPMENT THROUGHPUT

TECHNICAL FIELD

This disclosure relates generally to communications, e.g., to load balancing in wireless networks for improved user equipment throughput.

BACKGROUND

Communication devices (e.g., mobile phones, electronic pads or tablets, computers, . . . ) can operate and communicate wirelessly via communication links (e.g., channels) in a communication network. The communication network can comprise a number of sectors, which each can include a number of cells, wherein respective communication devices can connect to respective cells to facilitate wireless communication of data traffic by and between the communication devices. Respective cells can have respective (e.g., different (or same)) characteristics, resources, and capacities with respect to handling the communication of traffic associated with communication devices, wherein, for example, some cells (e.g., in a sector) can have more resources and/or a higher capacity to handle communication of traffic than other cells (e.g., in a sector).

The above-described description is merely intended to provide a contextual overview relating to communications, and is not intended to be exhaustive.

DETAILED DESCRIPTION

Figure 1:
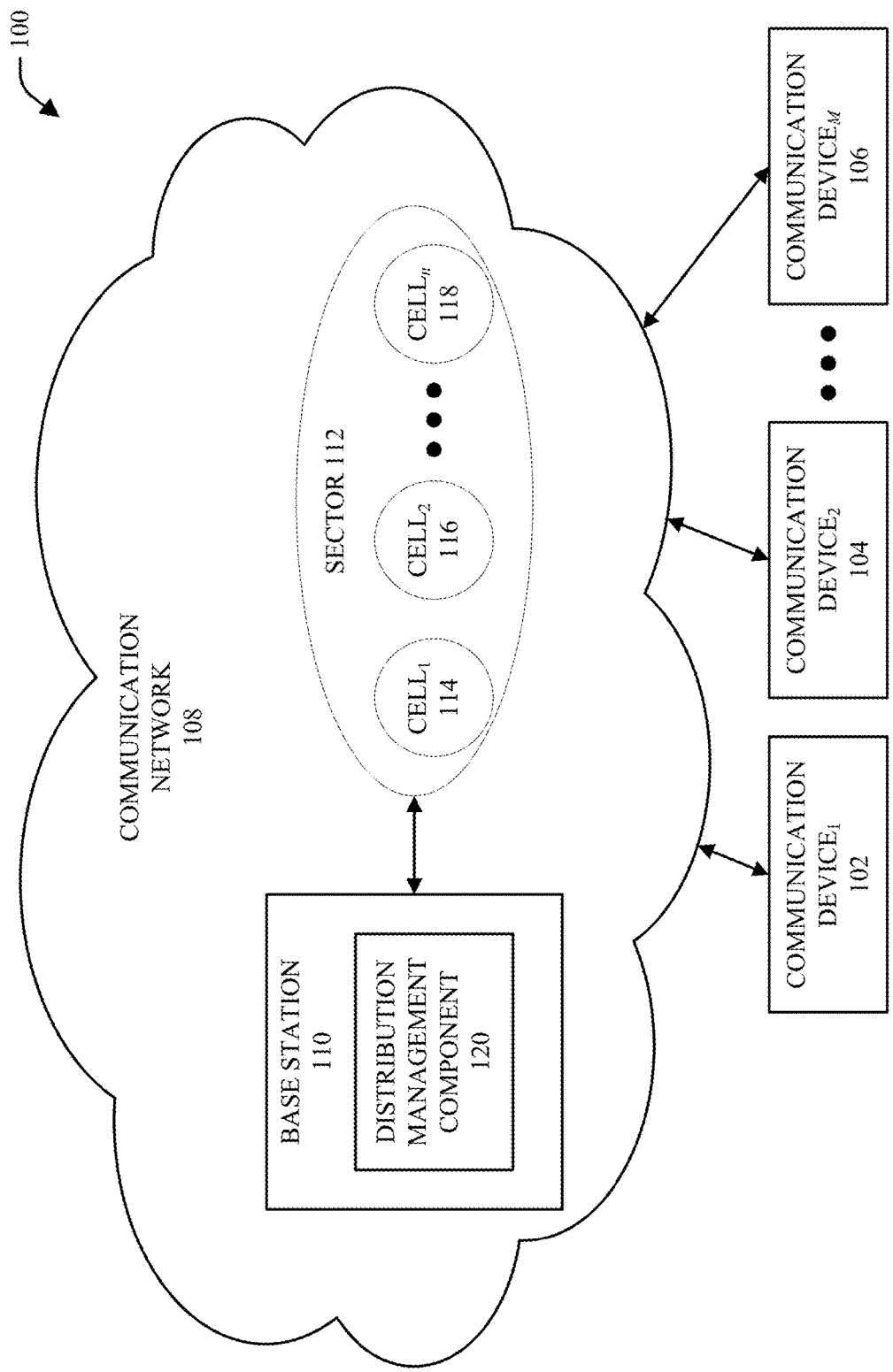
FIG. 1 illustrates a block diagram of an example system that can facilitate controlling distribution of traffic in a communication network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

User equipment (UE), e.g., communication devices (e.g., mobile phones, electronic pads or tablets, computers, devices in or integrated with vehicles, . . . ), can operate and communicate wirelessly via communication links (e.g., channels) in a communication network. The communication network can comprise a number of sectors, which each can include a number of cells, wherein respective communication devices can connect to respective cells to facilitate wireless communication of data traffic by and between the communication devices. Respective cells can have respective (e.g., different (or same)) characteristics, resources, and capacities with respect to handling the communication of traffic associated with communication devices. For example, some cells (e.g., in a sector) can have more resources and/or a higher capacity to handle communication of traffic than other cells (e.g., in a sector).

In a particular area where communication devices are being used by users, there can be more than one cell to which certain communication devices can connect. There can be instances where a significant number of communication devices are connected to one cell, even to the point of overloading the cell such that the service to the communication devices can be degraded, while a neighbor cell to which some of those communication devices are able to connect, but are not connected, can be underutilized and its available resources wasted (e.g., by not being utilized). Such inefficiencies in the communication network can result in an undesirable user experience for users of the communication devices. Thus, both network efficiency and user experience can be degraded without proper traffic distribution in the communication experience.

Communication networks can employ load balancing to try to distribute traffic to different cells in the communication network. Certain communication network designs can employ load balancing approaches that can distribute traffic from a network-centric point of view. For instance, certain load balancing approaches or algorithms typically can focus on distributing traffic such that network resources are substantially equally utilized. Such load balancing approaches or algorithms usually can aim to avoid or reduce network congestion in a communication network. While such load balancing approaches may ostensibly result in better use of radio resources in the communication network, such load balancing approaches can have various deficiencies that can result in an undesirable (e.g., unfavorable or less than optimal) user experience for the users of communication devices in the communication network.

One approach for load balancing is an equal traffic volume approach. This is an intuitive load balancing scheme that can attempt to equalize traffic volume among different carriers or cells. However, this load balancing scheme only has the potential for working for the ideal case when the capacities of all cells are equal. In the real world in a real communication network, individual cells can have different bandwidth and/or different interference levels, and different cells can have different capacities. Consequently, using this load balancing scheme to attempt "volume equalization" can relatively easily cause undesirable congestion in one cell and resource under-utilization in another cell.

Another scheme for load balancing is an equal resource utilization scheme. Under this scheme, considering that capacity inequality can exist with regard to different cells, traffic volume can be proportionally distributed to each cell according to their respective capacities. The effect of such load balancing can be that the resource utilization (e.g., physical resource block (PRB) utilization for Long Term Evolution (LTE) networks) may be equalized. Such load balancing scheme, however, focuses on network resource utilization only and does not take user performance into consideration. As a result, in practice, performance of communication devices and user experience of communication device users can be degraded when using such load balancing scheme.

Still another approach for load balancing is an equal UE throughput (MaxMin) scheme. Since different cells can have different capacities, e.g., the 1900 MHz band cells can have significantly higher capacities than the 700 MHz band cells, because the interference levels are typically lower for the 1900 MHz band cells. Even if the resource utilization is equalized for the two frequency bands of the cells, the UE throughput for the two frequency bands of the cells can be significantly different. The objective can then be to try to equalize the UE throughput among different frequency bands of the cells, such that traffic would be moved from the low capacity cells to the high capacity cells. The effect of such load balancing scheme would be improving "poor" carrier's performance at the cost of "good" carrier's performance, which can result in overall inefficiency of the system. Another setback of this scheme is that it typically may not take into consideration the number of UEs per carrier.

Yet another scheme for load balancing is a maximized weighted UE throughput (Max_wAvg) scheme. In this load balancing scheme, to consider the number of users in each cell, the scheme can attempt to maximize "traffic weighted" user throughput across all carriers. However, such a scheme may sacrifice a "poor" carrier's performance to achieve what is deemed to be the overall best performance of the network by ignoring the communication devices and associated users in the "poor" performing cells even if their performance is unreasonably or undesirably low. As a result, the performance of communication devices and the user experience of communication device users can be degraded when using such load balancing scheme.

To that end, techniques for controlling distribution of traffic to cells in a communication network are presented. The disclosed subject matter can employ a user-centric point of view with regard to traffic distribution in a communication network to improve overall user experience. The disclosed subject matter can employ improved load balancing techniques and algorithms to more desirably distribute traffic in a communication network such that the overall user experience of communication device users can be enhanced (e.g., improved or optimized). The disclosed improved load balancing techniques and algorithms (e.g., traffic distribution techniques and algorithms) also can improve network efficiency (e.g., as an indirect benefit). The disclosed subject matter therefore can be useful, and increasingly useful, as user performance becomes increasingly the goal for business (and users), and as networks (e.g., future networks, such as 5G networks) become increasingly user-centric, as it can become desirable from both business and technology viewpoints to optimize a communication network in terms of user performance.

In some implementations, a distribution management component can determine device traffic throughput for cells of a sector that satisfy a defined traffic throughput criterion relating to a harmonic mean of the device traffic throughput for the cells of the sector that maximizes the harmonic mean or at least satisfies a defined threshold minimum harmonic mean. As there can be a correspondence between the device traffic throughput for the cells of the sector and resource utilization of the cells of the sector, the distribution management component can determine the resource utilization for the cells of the sector that can satisfy a defined resource utilization criterion that can relate or correspond to the harmonic mean of the device traffic throughput for the cells of the sector that maximizes the harmonic mean or at least satisfies the defined threshold minimum harmonic mean. Based at least in part on the device traffic throughput or resource utilization level associated with the cells, the distribution management component can determine whether to adjust (e.g., adaptively adjust) one or more characteristics (e.g., one or more parameters) associated with a cell(s) of the cells to facilitate adjusting distribution of device traffic among the cells of the sector to achieve desirable load balancing of traffic by the sector and in the communication network. Load balancing can be achieved by controlling the respective parameters associated with the cells with regard to respective communication devices that are in an idle mode or respective communication devices that are in a connected mode to facilitate directing communication devices and associated traffic to desired cells.

These and other aspects and embodiments of the disclosed subject matter will now be described with respect to the drawings.

Referring now to the drawings, FIG. 1 illustrates a block diagram of an example system 100 that can facilitate controlling distribution of traffic in a communication network, in accordance with various aspects and embodiments of the disclosed subject matter. The system 100 can comprise a set of communication devices, which can include communication device$_1$ 102, communication device$_2$ 104, up through communication device$_M$ 106, wherein M can be virtually any desired number. A communication device can be, for example, a mobile and/or wireless communication device, such as a mobile phone, an electronic notebook, an electronic pad or tablet, an electronic gaming device, a personal digital assistant (PDA), a computer, a set-top box, or other type of communication device that can operate and communicate in a communication network environment of a communication network 108 of the system 100.

The communication network 108 can comprise a set of base stations (e.g., access points (APs)), including base station 110, that can serve communication devices (e.g., 102, 104, and/or 106, . . . ) located in respective coverage areas served by respective base stations in the communication network 108. For instance, the base station 110 can be associated with one or more sectors, such as sector 112, wherein respective sectors can comprise respective cells. The sector 112, for example, can comprise a set of cells, including cell$_1$ 114, cell$_2$ 116, up through cell$_n$ 118, that can have respective coverage areas that can form the coverage area covered by the sector 112 associated with the base station 110, wherein n can be virtually any desired number, which can be the same as M or different from M. The respective communication devices (e.g., 102, 104, and/or 106, . . . ) can be communicatively connected to the communication network 108 via respective wireless communication connections with one or more of the respective cells (e.g., 114, 116, and/or 118, . . . ) of the sector 112 associated with the base station 110.

The respective cells (e.g., 114, 116, 118, . . . ) can have respective characteristics, features, and/or capacities. For example, a first cell (e.g., 114) of the sector 112 can have a first frequency band (e.g., 700 megahertz (MHz)) and a first capacity level, and a second cell (e.g., 116) of the sector 112 can have a second frequency band (e.g., 1700 MHz, 1900 MHz, 2500 MHz, or other higher frequency) and a second capacity level. The capacity of a cell (e.g., 114, 116, or 118, . . . ) can depend on a variety of factors, including, for example, the bandwidth of a cell, radio frequency (RF) conditions of communication devices (e.g., 102, 104, 106, . . . ) in the network 108, proximity to a tower, the number of neighbor towers in the area, and/or another factor(s) that can cause interference in communications in the network 108. Typically, the higher the capacity of a cell, the better performance that communication devices can experience (e.g., faster communication rates or data downloads). All other factors being equal, a cell (e.g., 116) having a higher frequency band (e.g., 1900 MHz) than another cell (e.g., 114) having a relatively lower frequency band (e.g., 700 MHz) will typically have a higher capacity than the other cell.

In some implementations, the communication network 108 can comprise a distribution management component 120 that can facilitate desirably controlling distribution of traffic associated with communication devices (e.g., 102, 104, 106, . . . ) among the cells (e.g., 114, 116, 118, . . . ) of the communication network 108. In some embodiments, the distribution management component 120 can be part of the base station 110. In other embodiments, the distribution management component 120 can be separate from the base station 110 and can be associated with (e.g., communicatively connected to) the base station 110 and the sector 112.

The distribution management component 120 can determine device traffic throughput for cells (e.g., 114, 116, 118, . . . ) of the sector 112 that satisfy a defined traffic throughput criterion relating to a harmonic mean of the device traffic throughput for the cells of the sector 112 that can maximize the harmonic mean or at least satisfy a defined threshold minimum harmonic mean, in accordance with defined distribution management criteria. As there can be a correspondence between the device traffic throughput for the cells of the sector 112 and resource utilization of the cells (e.g., 114, 116, 118, . . . ), as described herein, the distribution management component 120 can determine the resource utilization for the cells of the sector that can satisfy a defined resource utilization criterion that can relate or correspond to the harmonic mean of the device traffic throughput for the cells (e.g., 114, 116, 118, . . . ) of the sector 112 that can maximize the harmonic mean or at least satisfy the defined threshold minimum harmonic mean.

In determining the device traffic throughput and/or resource utilization of the cells (e.g., 114, 116, 118, . . . ) of the sector 112, the distribution management component 120 can track performance indicators (e.g., key performance indicators (KPIs), including, for example, respective resource utilization of the respective cells and/or respective capacities of the respective cells during a previous (e.g., last) time period (e.g., previous cycle), which can be an idle-mode cycle having a first cycle rate and associated with communication devices (e.g., 102) in idle mode or a connected-mode cycle having a second cycle rate and associated with communication devices (e.g., 104) operating in a connected mode. The first cycle rate (e.g., every 15 minutes or other desired cycle rate) associated with the idle mode typically can be longer (e.g., significantly longer) than the second cycle rate (e.g., every 15 seconds or other desired cycle rate) associated with the connected mode.

Based at least in part on the device traffic throughput or resource utilization level associated with the cells (e.g., 114, 116, 118, . . . ), the distribution management component 120 can determine whether to adjust (e.g., adaptively adjust) one or more characteristics (e.g., one or more parameters) associated with a cell(s) (e.g., 114, 116, and/or 116, . . . ) of the cells to facilitate adjusting distribution of device traffic among the cells of the sector 112 to achieve desirable load balancing of traffic for the sector 112 and in the communication network 108. Load balancing can be achieved by controlling the respective parameters associated with the cells (e.g., 114, 116, 118, . . . ) with regard to respective communication devices (e.g., 102, 104, and/or 106, . . . ) that are in an idle mode (e.g., a sleep mode) or respective communication devices (e.g., 102, 104, and/or 106, . . . ) that are in a connected mode (e.g., active communication mode or other active mode other than idle mode) to facilitate directing communication devices and associated traffic to desired cells (e.g., 114, 116, or 118, . . . ).

To facilitate desired (e.g., suitable, optimal, or acceptable) distribution of traffic associated with communication devices associated with the communication network 108, the distribution management component 120 can employ one or more desired algorithms (e.g., load balancing or traffic distribution algorithms) that can enhance UE throughput for a sector 112 of the communication network 108, rather than with regard to the individual cells (e.g., 114, 116, 118, . . . ) of the sector 112. Such enhancement of the UE throughput can be more holistic or global than cell-level objectives employed by other load balancing schemes. From the point of view of communication device users, any improvement with respect to performance of the communication devices of such users and their user experience can be desirable regardless of which cell improvement is achieved. The disclosed subject matter, by employing the distribution management component 120 and associated algorithms, can, from the perspectives of the users, facilitate removing the cell boundaries and constraints from the communication network point of view.

Since the harmonic mean can be dominated by the minimum of its arguments, the disclosed enhancement processes (e.g., improvement or optimization processes) employed by the distribution management component 120 can facilitate directing or steering traffic away from cells or carriers determined to be relatively poor performing cells or carriers to other cells or carriers determined to be relatively good cells or carriers. This can be desirable in that the disclosed subject matter can provide a direct benefit by improving performance of communication devices of users and accordingly can improve user experience, while also providing an indirect benefit by improving the efficiency and performance of the communication network 108 with respect to resource utilization of resources of the communication network 108, such as resource utilization of resources of the sector 112.

To facilitate illustrating various aspects and implementations of the disclosed subject matter, various features and equations relating to and/or employed by the disclosed subject matter will be described. If the total traffic for a sector (e.g., 112) of n cells (e.g., 114, 116, 118, . . . ) is J, it can be desirable to distribute a portion of the total traffic, $J_i$, to cell$_i$, such that the overall UE throughput can be enhanced (e.g., maximized, optimized, or improved), wherein i can be a desired number.

If the average UE throughput for cell$_i$ is defined as T$_i$, to facilitate desirable distribution of traffic among cells, the distribution management component 120 can desirably enhance (e.g., maximize, optimize, or improve) the harmonic mean of UE throughput for all cells (e.g., 114, 116, 118, ... ) of the sector (e.g., 112). For instance, the distribution management component 120 can maximize the harmonic mean of UE throughput for the cells of the sector in accordance with Equation 1 (Eq. 1):

$$\text{Max}\left(\frac{\text{overall traffic in bits}}{\text{overall time in seconds}}\right) = \text{Max}\left(\frac{\sum J_i}{\sum \frac{J_i}{T_i}}\right), \quad \text{(Eq. 1)}$$

$$\text{s.t.} \sum J_i = J$$

If the capacity of cell$_i$ is defined as C$_i$, which can be determined or estimated by calculating the number of bits that are being successfully transmitted over a period of time using a certain amount of resources (e.g., LTE PRBs), the capacity C$_i$, can be determined (e.g., calculated) using Equation 2 (Eq. 2) as follows:

$$C_i = \text{Spectral efficiency in } \frac{bps}{Hz} * \text{Totalbandwidth in MHz} \quad \text{(Eq. 2)}$$

From queuing theory, it can be determined or derived that T$_i$=C$_i$−J$_i$. Using a Lagrange multiplier method, the desired (e.g., optimal or enhanced) traffic J$_i$ distributed to cell$_i$ can be determined in accordance with Equation 3 (Eq. 3) as follows:

$$J_i = C_i\left(1 - \frac{\sum_{k=1}^{N} C_k - J}{\sum_{k=1}^{N} \sqrt{C_i C_k}}\right), \quad i = 1, 2, \ldots, N \quad \text{(Eq. 3)}$$

The results of Equation 3 can indicate that, in order to desirably improve (e.g., optimize or enhance) overall UE throughput for a sector (e.g., 112), it can be desirable for a higher-capacity cell C$_i$ of the sector to be more heavily loaded with traffic associated with the communication devices than lower-capacity cells of the sector, for example, such that the resource utilization (e.g., ρ$_i$) of the higher-capacity cell C$_i$ can be significantly higher than the respective resource utilization of the respective lower-capacity cells of the sector, in accordance with the following equation: ρ$_i$=J$_i$/C$_i$.

In some implementations, to facilitate achieving load balancing, the distribution management component 120 can manage communication devices (e.g., 102) in idle mode differently from communication devices that are in connected mode. Since such communication devices are in idle mode, direct controlling of individual communication devices in idle mode generally is not done. Instead, with regard to communication devices in idle mode, the distribution management component 120 can control one or more parameters to facilitate desirable cell selection (e.g., reselection) by the communication devices (e.g., 102) in idle mode. For example, if the cells (e.g., 114, 116, and/or 118, ... ) in the sector 112 have equal priority to each other, the distribution management component 120 can control an offset parameter (e.g., a quality offset parameter, such as Q$_{offset\_s,n}$), which can be associated with a target cell and a serving cell, or a hysteresis parameter (e.g., Q$_{hyst,s}$) associated with a serving cell to facilitate controlling selection of a cell by communication devices (e.g., 102) that are in idle mode.

The communication devices (e.g., 102, 104, 106, ... ) can perform cell reselection based at least in part on the respective rankings of a current cell (e.g., 114) with which the communication devices are connected and neighboring cells (e.g., 116, 118) that neighbor (e.g., are in proximity to) the current cell. A communication device (e.g., 102, 104, or 106, ... ) can determine a ranking for a cell based at least in part on ranking (R) values, wherein R$_s$ can be the ranking of a serving cell and R$_n$ can be a ranking of a neighbor cell (e.g., the n-th neighbor cell) that neighbors the serving cell. The communication device can determine (e.g., calculate) the ranking of the serving cell (R$_s$) as follows: R$_s$=Q$_{meas,s}$+Q$_{hyst,s}$, wherein Q$_{meas,s}$ can be the cell received quality of the signal of the serving cell as measured by the communication device, and Q$_{hyst,s}$ can be the hysteresis parameter associated with the serving cell. The hysteresis parameter typically can be set to a desired value to facilitate discouraging a communication device from moving (e.g., bouncing) back and forth between respective cells (e.g., serving cell and another cell) in response to certain fluctuations in respective signal levels that may occur with respect to the communication device and the respective cells. The communication device can determine (e.g., calculate) the ranking of the neighbor cell (R$_n$) as follows: R$_n$=Q$_{meas,n}$−Q$_{offset\_s,n}$, wherein Q$_{meas,n}$ can be the cell received quality of the signal of the neighbor cell (e.g., the n-th neighbor cell) as measured by the communication device, and Q$_{offset\_s,n}$ can be an offset parameter associated with the serving cell and the neighbor cell (e.g., the n-th neighbor cell) that is to be applied with respect to the neighbor cell.

The communication device (e.g., 102, 104, or 106, ... ) can reselect from a serving cell (e.g., 114) to a highest-ranked cell (e.g., 116), based at least in part on the respective rankings of the serving cell (e.g., 114) and the neighbor cells (e.g., 116, 118), when the highest-ranked cell is higher ranked than the serving cell for at least a defined period of time, wherein the defined period of time can be determined in accordance with the defined distribution management criteria.

To facilitate idle mode load balancing control, if the neighbor cell (e.g., 116) is the target cell, the distribution management component 120 can decrease the offset parameter (e.g., Q$_{offset\_s,n}$) to facilitate improving (e.g., increasing) the ranking of the target cell (e.g., 116) relative to the ranking of the serving cell (e.g., 114) (and the ranking(s) of the other cell(s) (e.g., 118) of the sector 112). This adjusting (e.g., decreasing) of the offset parameter and resulting improvement in the ranking of the target cell (e.g., 116) can cause more communication devices in the sector 112 to decide to connect to the target cell (e.g., 116), wherein, for example, a communication device (e.g., 102) connected to the serving cell (e.g., 114) can reselect the target cell (e.g., 116) to move from the serving cell and connect to the target cell. Alternatively, if desired, the distribution management component 120 can increase the offset parameter (e.g., Q$_{offset\_s,n}$) to facilitate degrading (e.g., reducing) the ranking of the target cell (e.g., 116) relative to the ranking of the serving cell (e.g., 114) (and the ranking(s) of the other cell(s) (e.g., 118) of the sector 112).

In some implementations, to facilitate idle mode load balancing control, if the neighbor cell (e.g., 116) is the source cell, the distribution management component 120 can increase the offset parameter (e.g., $Q_{offset\_s,n}$) to facilitate degrading (e.g., reducing) the ranking of the source cell (e.g., 116) relative to the ranking of the target cell (e.g., 118) (and the ranking(s) of the other cell(s) (e.g., 114) of the sector 112). This adjusting (e.g., increasing) of the offset parameter and resulting degrading in the ranking of the source cell (e.g., 116) can cause less communication devices in the sector 112 to decide to connect to the source cell (e.g., 116), wherein, for example, a communication device (e.g., 102) connected to the source cell (e.g., 116) can reselect the target cell (e.g., 118) to move from the source cell and connect to the target cell. Alternatively, if desired, the distribution management component 120 can decrease the offset parameter (e.g., $Q_{offset\_s,n}$) to facilitate improving (e.g., increasing) the ranking of the source cell (e.g., 116) relative to the ranking of the target cell (e.g., 118) (and the ranking(s) of the other cell(s) (e.g., 114) of the sector 112).

In some sectors, cells of the sector can have non-equal priorities with respect to each other. If the cells (e.g., 114, 116, and/or 118, . . . ) in the sector 112 are of non-equal priority with respect to each other, the distribution management component 120 can control one or more parameters, such as a defined high threshold value (e.g., threshXhigh) associated with a target cell, a defined low threshold value (e.g., threshXlow) associated with a target cell, or a defined low threshold serving cell value (e.g., threshServingLow) associated with a serving cell, to facilitate controlling selection of a cell by communication devices (e.g., 102) in idle mode.

The communication devices (e.g., 102, 104, 106, . . . ) can respectively measure the respective qualities of the respective signals received from respective cells (e.g., 114, 116, and/or 118, . . . ) in the sector 112, including the serving cell and the target cell. A communication device (e.g., 102, 104, or 106) can select (e.g., reselect) a target cell or source cell based at least in part on the measurement of the signal quality of the target cell (e.g., TargetCellMeas) and/or the measurement of the signal quality of the serving cell (e.g., ServingCellMeas), and based at least in part on the applicable threshold value(s) (e.g., applicable reselection threshold value(s)) and respective priorities of the respective cells.

For instance, a communication device (e.g., 102, 104, or 106) can measure the signal quality of a target cell (e.g., 116) and/or the signal quality of a source cell (e.g., 114). The communication device (e.g., 102, 104, or 106) can compare the signal quality of the target cell (e.g., 116) and/or the signal quality of the source cell (e.g., 114) to the applicable threshold value(s) (e.g., threshXhigh, threshXlow, and/or threshServingLow) to facilitate determining whether cell reselection is to be performed. In some implementations, the communication device (e.g., 102, 104, or 106) can select or reselect to the higher priority cell (e.g., from the lower priority cell) if the communication device determines that the signal quality of the target cell (e.g., 116) with respect to the communication device is greater than the defined high threshold value (e.g., threshXhigh) associated with the target cell.

In certain implementations, the communication device (e.g., 102, 104, or 106) can select or reselect to the lower priority cell (e.g., from the higher priority cell) if the communication device determines that the signal quality of the target cell (e.g., 116) with respect to the communication device is greater than the defined low threshold value (e.g., threshXlow) associated with the target cell and the signal quality of the serving cell (e.g., ServingCellMeas) with respect to the communication device is less than the defined low threshold serving cell value (e.g., threshServingLow) associated with the serving cell.

With respect to thresholds that can be employed in connection with cells that have non-equal priorities in the sector 112, the distribution management component 120 can determine, set, and/or adjust (e.g., adaptively adjust) the respective threshold values (e.g., threshXhigh, threshXlow, or threshServingLow) associated with respective cells of respective priorities, to facilitate controlling reselection of cells by communication devices and steering communication devices and associated traffic to desired cells in the sector 112, in accordance with the defined distribution management criteria. For instance, with respect to source cells, if the source cell (e.g., 114) has a lower priority than the target cell (e.g., 116), the distribution management component 120 can decrease the defined high threshold value (e.g., threshXhigh) associated with the target cell to facilitate steering communication devices (e.g., 102, 104, or 106) away from connecting to the source cell and towards connecting to the target cell (e.g., when doing so is in accordance with the defined distribution management criteria), as the lower threshold value can make it easier for the signal quality of the target cell (e.g., TargetCellMeas) to satisfy (e.g., exceed) the defined high threshold value (e.g., threshXhigh) associated with the target cell. This can result in more communication devices reselecting to the target cell as the higher priority cell.

If the source cell (e.g., 114) has a higher priority than the target cell (e.g., 116), the distribution management component 120 can decrease the defined low threshold value (e.g., threshXlow) associated with the target cell and/or can increase the defined low threshold serving cell value (e.g., threshServingLow) associated with the source cell to facilitate steering communication devices (e.g., 102, 104, or 106) away from connecting to the source cell and towards connecting to the target cell (e.g., when doing so is in accordance with the defined distribution management criteria). This can result in more communication devices reselecting to the target cell as a lower priority cell. The relatively lower threshold value for the defined low threshold value (e.g., threshXlow) associated with the target cell can make it relatively easier for the signal quality of the target cell (e.g., TargetCellMeas) to satisfy (e.g., exceed) the defined low threshold value (e.g., threshXlow). The relatively higher threshold value for the defined low threshold serving cell value (e.g., threshServingLow) associated with the source cell can make it relatively easier for the signal quality of the source cell (e.g., ServingCellMeas) to be less than the defined low threshold serving cell value (e.g., threshServingLow).

With respect to target cells, if the target cell (e.g., 116) has a lower priority than the source cell (e.g., 114), the distribution management component 120 can increase the defined high threshold value (e.g., threshXhigh) associated with the target cell to facilitate steering communication devices (e.g., 102, 104, or 106) towards connecting to or maintaining a connection with the target cell (e.g., when doing so is in accordance with the defined distribution management criteria), as the relatively higher threshold value can make it relatively more difficult for the signal quality of the target cell (e.g., TargetCellMeas) to satisfy (e.g., exceed) the defined high threshold value (e.g., threshXhigh) associated with the target cell. This can result in more communication devices selecting or reselecting to the target cell as a lower priority cell.

If the target cell (e.g., 116) has a higher priority than the source cell (e.g., 114), the distribution management component 120 can increase the defined low threshold value (e.g., threshXlow) associated with the target cell and/or can decrease the defined low threshold serving cell value (e.g., threshServingLow) associated with the source cell to facilitate steering communication devices (e.g., 102, 104, or 106) towards connecting to or maintaining a connection with the target cell (e.g., when doing so is in accordance with the defined distribution management criteria). This can result in more communication devices reselecting to the target cell as a higher priority cell. The relatively higher threshold value for the defined low threshold value (e.g., threshXlow) associated with the target cell can make it relatively more difficult for the signal quality of the target cell (e.g., TargetCellMeas) to satisfy (e.g., exceed) the defined low threshold value (e.g., threshXlow). The relatively lower threshold value for the defined low threshold serving cell value (e.g., threshServingLow) associated with the source cell can make it relatively more difficult for the signal quality of the source cell (e.g., ServingCellMeas) to be lower than the defined low threshold serving cell value (e.g., threshServingLow).

With regard to communication devices (e.g., 104) in a connected mode, the distribution management component 120 can facilitate controlling communication devices and distribution of associated traffic by employing UE-level control that can involve measurement and signaling associated with the communication devices (e.g., 102, 104, and/or 106, . . . ) that are in a connected mode. With regard to handover (e.g., inter-frequency handover), a communication device (e.g., 104) that is in connected mode can be handed over, via a handover process, to a different cell (e.g., 116) after such communication device is already connected to a cell (e.g., 114), when in accordance with the defined distribution management criteria. The distribution management component 120 can direct all or a desired portion of such communication devices (e.g., 104) that are in a connected mode to perform measurements of respective signal strengths and/or respective signal qualities of respective cells of the sector 112 through handover events and report the measurements of signal strengths and/or signal qualities to the distribution management component 120. For instance, the distribution management component 120 can determine a desired portion of the communication devices (e.g., 104) that are to measure the respective signal strength (e.g., reference signal received power (RSRP)) and/or the respective signal qualities (e.g., reference signal received quality (RSRQ)) of other cells (e.g., 116, 118) using measurement gaps, and can direct the desired portion of the communication devices to measure the respective signal strengths and/or the respective signal qualities of the other cells using measurement gaps. When a communication device (e.g., 102) is measuring signals (e.g., signal strengths, signal qualities) of cells (e.g., 114, 116, 118, . . . ), the communication device has to stop communicating (e.g., transmitting, receiving) for a short period of time to perform the measurements. This can be referred to as a measurement gap.

As an example, with regard to LTE communication networks, the handover event can be Event A5, which can be triggered when the signal strength level of a serving cell with respect to a communication device is functionally lower (e.g., worse) than a first defined threshold level, and the signal strength level of a neighbor cell with respect to the communication device is functionally higher (e.g., better) than a second defined threshold level, in accordance with the following equations (4) and (5) as follows:

$$MEAS_{serv}+Hyst<Threshold1, \quad (Eq.\ 4)$$

$$MEAS_{neigh}+O_{neigh,freq}+O_{neigh,cell}-Hyst>Threshold2, \quad (Eq.\ 5)$$

wherein $MEAS_{serv}$ is the signal strength level of the serving cell measured by the communication device, $MEAS_{neigh}$ is the signal strength level of the neighbor cell (e.g., n-th neighbor cell) measured by the communication device, Hyst is the hysteresis, Threshold1 is the first defined threshold level, and Threshold2 is the second defined threshold level. The first defined threshold level, the second defined threshold level, and the hysteresis value can be adaptively configurable (e.g., by the distribution management component 120) based at least in part on the information (e.g., signal strength information, time the handover was triggered) in the handover triggering reports.

Accordingly, the distribution management component 120 can control one or more of the parameters to facilitate controlling (e.g., adaptively controlling) handover events (e.g., inter-frequency handover events) and to facilitate controlling (e.g., adaptively controlling) steering communication devices (e.g., 104) to or from a cell (e.g., a source cell) from or to another cell (e.g., a neighbor cell) in the sector 112. The one or more parameters can comprise, for example, the first defined threshold value, a hysteresis parameter associated with the serving cell, or a second defined threshold value (e.g., a defined threshold value associated with a neighbor cell).

For example, if the serving cell is the source cell, the distribution management component 120 can decrease the first defined threshold level and/or the second defined threshold level to steer communication devices away from connecting to the source cell and towards connecting to a neighbor cell to facilitate desirably distributing traffic among the cells (e.g., 114, 116, 118, . . . ) of the sector 112 (e.g., when doing so is in accordance with the defined distribution management criteria). Alternatively, if the serving cell is the source cell, the distribution management component 120 can increase the first defined threshold level and/or the second defined threshold level to steer communication devices away toward connecting, or maintaining their connection, to the source cell and away from connecting to a neighbor cell to facilitate desirably distributing traffic among the cells (e.g., 114, 116, 118, . . . ) of the sector 112 (e.g., when doing so is in accordance with the defined distribution management criteria).

In some implementations, if the distribution management component 120 determines that not enough qualified (e.g., candidate) communication devices (e.g., communication device 102) are reporting measurements of the respective signal strengths and/or respective signal qualities associated with respective cells to the distribution management component 120, the distribution management component 120 can modify one or more handover parameters to facilitate increasing the number of qualified communication devices that are reporting measurements of the respective signal strengths and/or respective signal qualities associated with the respective cells to the distribution management component 120.

The distribution management component 120 can determine whether a qualified (e.g., candidate) communication device (e.g., 104) is to be moved from a source cell (e.g., 114) to a target cell (e.g., 116), based at least in part on the results of analyzing the respective signal strengths and/or the respective signal qualities of the respective cells (e.g., 114, 116, and/or 118, . . . ) of the sector 112, in accordance with the defined distribution management criteria. If the distribution management component 120 determines that one or more communication devices (e.g., 104) are to be moved from one cell (e.g., 114) to a target cell (e.g., 116), the distribution management component 120 can select one or more qualified communication devices to move from the cell to the target cell.

Figure 2:
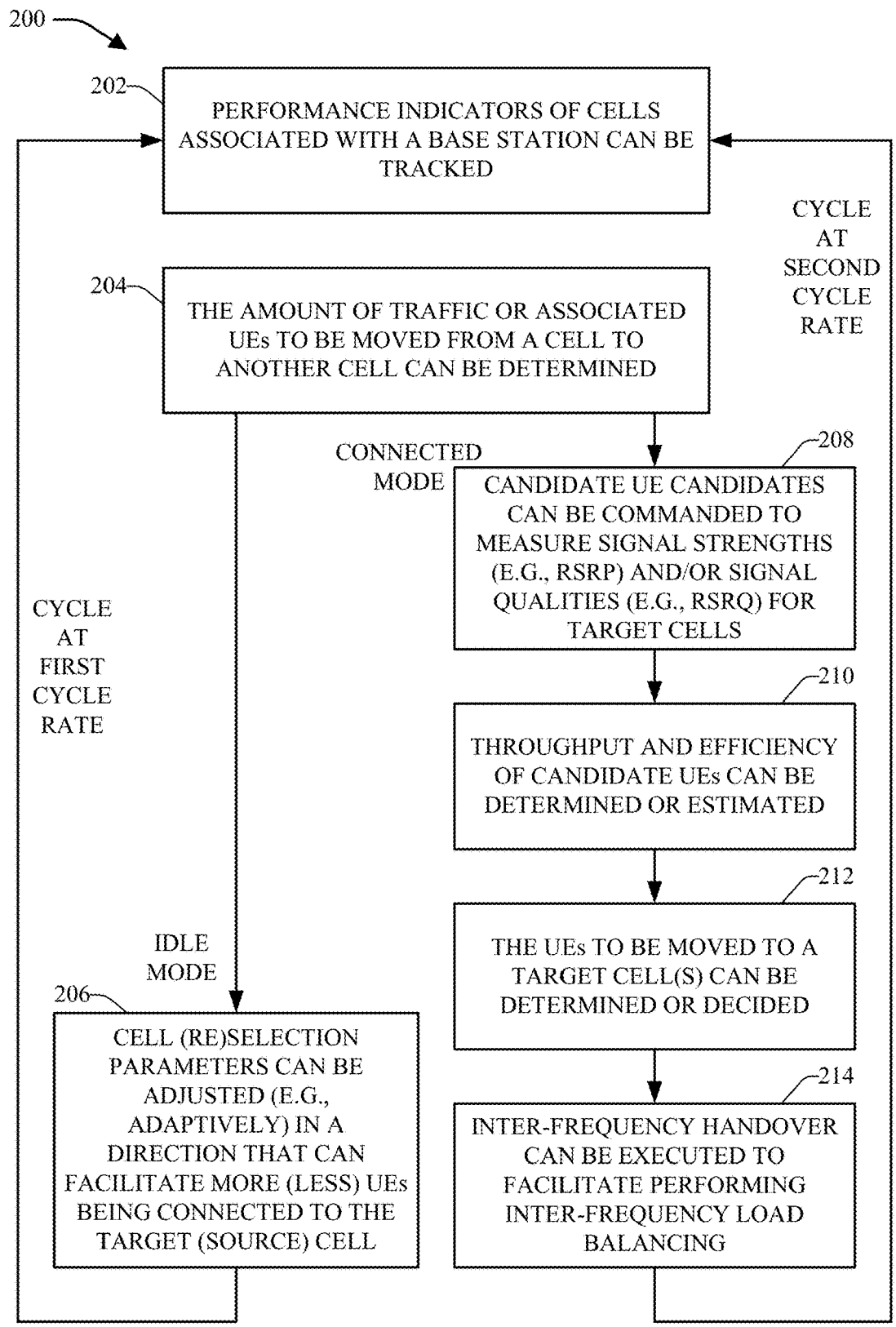
FIG. 2 depicts a block diagram of an example load balancing process that can facilitate steering or directing communication devices to respective cells of a sector to facilitate desirable load balancing and distribution of traffic in a communication network, in accordance with various aspects and embodiments of the disclosed subject matter.

Referring briefly to FIG. 2 (along with FIG. 1), FIG. 2 depicts a block diagram of an example load balancing process 200 that can facilitate steering or directing communication devices to respective cells of a sector to facilitate desirable load balancing and distribution of traffic in a communication network, in accordance with various aspects and embodiments of the disclosed subject matter. The distribution management component 120 can perform or facilitate performing the various operations associated with the load balancing process 200 to facilitate steering communication devices (e.g., 102, 104, 106, . . . ) to respective cells (e.g., 114, 116, 118, . . . ) of the sector 112 to facilitate desirable load balancing and distribution of traffic in the communication network 108, in accordance with the defined distribution management criteria.

The distribution management component 120 and other components (e.g., cells) can employ and perform the load balancing process 200 concurrently (e.g., in parallel) with respect to communication devices (e.g., 102) in the idle mode and communication devices (e.g., 104) in a connected mode. With regard to communication devices (e.g., 102) in idle mode, the distribution management component 120 can perform the operations of the load balancing process 200 relating to the communication devices in idle mode every idle-mode cycle, which can occur at a first cycle rate (e.g., cycle occurs every 5 minutes, 10 minutes, 15 minutes, or 20 minutes, or at another desired cycle rate). With regard to communication devices (e.g., 104) operating in a connected mode, the distribution management component 120 can perform the operations of the load balancing process 200 relating to the communication devices in a connected mode every connected-mode cycle, which can occur at a second cycle rate (e.g., cycle occurs every 5 seconds, 10 seconds, 15 seconds, or 20 seconds, or at another desired cycle rate). The first cycle rate typically can be slower or longer (e.g., significantly longer) than the second cycle rate.

At reference numeral 202 of the load balancing process 200, in accordance with the distribution management algorithm and criteria, the distribution management component 120 can track performance indicators (e.g., key performance indicators (KPIs)) of the cells (e.g., 114, 116, 118, . . . ) associated with the base station. The performance indicators that can be tracked can include, for example, respective resource utilization of the respective cells (e.g., 114, 116, 118, . . . ) of the sector 112, respective cell capacities of the respective cells (e.g., 114, 116, 118, . . . ) of the sector 112, the amount of traffic being communicated to or from respective communication devices in the sector 112, although other performance indicators can be tracked and analyzed as well.

At reference numeral 204 of the load balancing process 200, the distribution management component 120 can determine the amount (e.g., magnitude) of traffic that is to be moved from one cell (e.g., cell 114) or carrier to another cell (e.g., cell 116) or carrier of the sector 112 based at least in part on the information relating to the performance indicators that was obtained from the tracking of the performance indicators. For example, the distribution management component 120 can analyze the information relating to the performance indicators, and can determine the amount of traffic that is to be moved from one cell (e.g., cell 114) or carrier to another cell (e.g., cell 116) or carrier of the sector 112 based at least in part on the results of analyzing the information relating to (e.g., indicating) the respective resource utilization of the respective cells (e.g., 114, 116, 118, . . . ) of the sector 112 the respective cell capacities of the respective cells (e.g., 114, 116, 118, . . . ) of the sector 112, and/or other performance indicators. The information relating to the performance indicators can be information that was obtained during or in connection with, or relating to, a previous (e.g., last) cycle (e.g., a previous cycle associated with communication devices in idle mode, or a previous cycle associated with communication devices operating in a connected mode).

At reference numeral 206, the distribution management component 120 can adjust (e.g., adaptively adjust) one or more parameters, such as, for example, cell (re)selection parameters, in a direction (e.g., increasing direction, or decreasing direction) to facilitate steering or causing more communication devices to connect to the target cell (e.g., 116) or less communication devices to connect to the source cell (e.g., 114), based at least in part on the results of analyzing the performance indicators associated with the previous cycle. With respect to the idle mode, the load balancing process 200 can return to reference numeral 202.

With regard to communication devices operating in a connected mode, at reference numeral 208, the distribution management component 120 or a source cell (e.g., 114) can determine one or more candidate communication devices of the communication devices (e.g., 104) that are operating in a connected mode, and can command the one or more candidate communication devices (e.g., via an instruction sent to the candidate communication device(s)) to measure their respective signal strengths (e.g., RSRP) and/or respective signal qualities (e.g., RSRQ) with regard to respective target cells (e.g., 116, 118, . . . ) of the sector 112.

At reference numeral 210, the distribution management component 120 can determine or estimate the respective device traffic throughput and respective efficiency of the respective candidate communication devices (e.g., 104) in respective target cells (e.g., 116, 118, . . . ), based at least in part on the results of analyzing the respective signal strengths (e.g., RSRP) and/or respective signal qualities (e.g., RSRQ) of the respective candidate communication devices (e.g., 104) with respect to the respective target cells (e.g., 116, 118, . . . ) of the sector 112. At reference numeral 212, the distribution management component 120 can determine (e.g., decide) which communication devices (e.g., 104) are to be moved to the one or more target cells (e.g., 116, 118, . . . ), based at least in part on the respective device traffic throughput and the respective efficiency of the respective candidate communication devices with regard to the respective target cells (e.g., 116, 118, . . . ), in accordance with the defined distribution management criteria (e.g., UE or traffic moving criteria of the defined distribution management criteria).

At reference numeral 214, in response to determining that one or more communication devices (e.g., 104) are to be moved from one cell (e.g., source cell) to one or more of the target cells (e.g., 116, 118, . . . ) of the sector 112, the distribution management component 120 can execute or facilitate executing (e.g., via the base station 110) an inter-frequency handover to hand over (e.g., move) one or more of the candidate communication devices (e.g., 104) to one or more of the target cells (e.g., 116, 118, . . . ), with which the one or more candidate communication devices can connect, to facilitate desirable load balancing of traffic among the cells (e.g., 114, 116, 118, . . . ) of the sector 112.

With further regard to FIG. 1, in some implementations, the distribution management component 120 can employ a defined distribution management algorithm to facilitate desirable and practical load balancing of traffic among cells (e.g., 114, 116, 118, . . . ) of the sector 112 in the communication network 108, in accordance with the defined traffic distribution criteria. The distribution management component 120 (and other components (e.g., cells)) can perform the defined distribution management algorithm concurrently (e.g., in parallel) with respect to communication devices (e.g., 102) in the idle mode and communication devices (e.g., 104) that are operating in a connected mode. With regard to communication devices (e.g., 102) in the idle mode, the distribution management component 120 can perform the operations of the load balancing process 200 relating to the communication devices in idle mode every idle-mode cycle, which can occur at the first cycle rate. With regard to communication devices (e.g., 104) operating in a connected mode, the distribution management component 120 can perform the operations of the load balancing process 200 relating to the communication devices in a connected mode every connected-mode cycle, which can occur at the second cycle rate.

During a cycle (e.g., $cycle_n$), the distribution management component 120 can monitor and/or determine (e.g., calculate) respective resource utilization (e.g., $\rho_n$) of respective cells (e.g., 114, 116, 118, . . . ) or carriers in the sector 112 of the communication network 108 based at least in part on respective amounts of traffic distributed to the respective cells and respective capacities of the respective cells during the cycle (e.g., using the applicable equations disclosed herein). The distribution management component 120 also can determine (e.g., calculate) a desired (e.g., optimal, maximal, suitable, or acceptable) resource utilization (e.g., $\rho_{opt,n}$) of the cells (e.g., 114, 116, 118, . . . ) or carriers in the sector 112 of the communication network 108. For example, the distribution management component 120 can determine the desired resource utilization of the cells (e.g., 114, 116, 118, . . . ) or carriers in the sector 112 that satisfies the defined traffic throughput criterion. The defined traffic throughput criterion can relate to, for example, the harmonic mean of the device traffic throughput for the cells (e.g., 114, 116, 118, . . . ) of the sector 112 that can maximize the harmonic mean or at least satisfy a defined threshold minimum harmonic mean. The defined traffic throughput criterion can be part of the defined distribution management criteria.

The distribution management component can determine (e.g., calculate) a delta resource utilization (e.g., $\Delta\rho$) associated with the cells (e.g., 114, 116, 118, . . . ) or carriers of the sector 112 as a function of the desired resource utilization (e.g., optimal, maximal, suitable, or acceptable) and the respective resource utilization levels of the respective cells (e.g., 114, 116, 118, . . . ) or carriers in the sector 112. For example, the distribution management component 120 can calculate the delta resource utilization as being equal to the desired resource utilization minus the resource utilization level of the respective cells (e.g., 114, 116, 118, . . . ) or carriers in the sector 112 (e.g., $\Delta\rho_n = \rho_{opt,n} - \rho_n$).

The distribution management component 120 can determine whether the delta resource utilization (e.g., $\Delta\rho_n$) satisfies a first defined threshold value (e.g., $T_0$), wherein the first defined threshold value can relate to or indicate a resource utilization level of the cells (e.g., 114, 116, 118, . . . ) or carriers that is close enough to the desired resource utilization (e.g., $\rho_{opt,n}$) such that performing a target action (e.g., parameter adjustment, interfrequency handover, and/or other load balancing operation) is not desired during this cycle. In some implementations, the first defined threshold value can be a positive value, which can be determined based at least in part on the defined distribution management criteria. The distribution management component 120 can determine or calculate the absolute value of the delta resource utilization (e.g. $|\Delta\rho_n|$), and can compare the absolute value of the delta resource utilization (e.g., $|\Delta\rho_n|$) to the first defined threshold value (e.g., $T_0$) to determine whether the delta resource utilization satisfies (e.g., exceeds) the first defined threshold value (e.g., determine whether $|\Delta\rho_n| > T_0$).

In other implementations, the first defined threshold value can comprise a value range that can range from the positive value to a corresponding negative value (e.g., $\pm T_0$). In such other implementations, the distribution management component 120 can compare the delta resource utilization (e.g., $\Delta\rho_n$) to the first defined threshold value range (e.g., $\pm T_0$) to determine whether the delta resource utilization satisfies the first defined threshold value range (e.g., exceeds the positive value or is less than the negative value of the first defined threshold value range).

If the distribution management component 120 determines that the absolute value of the delta resource utilization (or the delta resource utilization) does not satisfy the first defined threshold value (or value range), the distribution management component 120 can determine that no target action is to be performed in connection with the communication devices (e.g., 102, 104, 106, . . . ) and/or cells (e.g., 114, 116, 118, . . . ) or carriers with regard to this cycle.

If the distribution management component 120 determines that the absolute value of the delta resource utilization (or the delta resource utilization) satisfies the first defined threshold value (or value range), the distribution management component 120 can determine whether the potential target action of this cycle is the same as the potential target action of the previous cycle. For example, to facilitate determining whether the potential target action of this cycle is the same as the potential target action of the previous cycle, the distribution management component 120 can evaluate (e.g., compare) the sign (e.g., mathematical sign, such as + or −) of the delta resource utilization (e.g., $\Delta\rho_n$) of this cycle and the sign of the delta resource utilization (e.g., $\Delta\rho_{n-1}$) of the last cycle. The distribution management component 120 can determine whether the sign of the delta resource utilization (e.g., $\Delta\rho_n$) of this cycle is the same as the sign of the delta resource utilization (e.g., $\Delta\rho_{n-1}$) of the last cycle (e.g., $\text{sign}(\Delta\rho_n) = \text{sign}(\Delta\rho_{n-1})$), based at least in part on the result of the evaluation of the respective signs.

If the distribution management component 120 determines that the potential target action of this cycle is not the same as the potential target action of the previous cycle, the distribution management component 120 can determine that no target action is to be performed with regard to this cycle. For example, if the sign of the delta resource utilization (e.g., $\Delta\rho_n$) of this cycle is not the same as the sign of the delta resource utilization (e.g., $\Delta\rho_{n-1}$) of the previous cycle, the distribution management component 120 can determine or decide that the potential target action of this cycle is not the same as the potential target action of the last cycle. As there is some volatility in delta resource utilizations over the current and previous cycles (e.g., as evidenced by the signs of the respective delta resource utilizations not being the same), the distribution management component 120 can determine that no target action is to be performed with regard to this cycle, and can decide to wait for a clearer signal that a target action should be taken and what the target action should be.

If, instead, the sign of the delta resource utilization (e.g., $\Delta\rho_n$) of this cycle is the same as the sign of the delta resource utilization (e.g., $\Delta\rho_{n-1}$) of the previous cycle, the distribution management component 120 can determine or decide that the potential target action of this cycle is the same as the potential target action of the last cycle. As a result, the distribution management component 120 can determine that a target action potentially can still be performed, if other conditions are satisfied in accordance with the defined distribution management criteria.

If the distribution management component 120 determines that the potential target action of this cycle is the same as the potential target action of the previous cycle, the distribution management component 120 can determine that more aggressive action (e.g., adjustment of parameters) potentially can be desirable, in accordance with the defined distribution management criteria, and further analysis can be performed to facilitate determining whether a target action is to be performed.

In some implementations, in response to determining that the potential target action of this cycle is the same as the potential target action of the previous cycle, the distribution management component 120 can determine whether a delta value satisfies a second defined threshold value (e.g., $T_1$), wherein the distribution management component can determine the delta value as a function of the delta resource utilization (e.g., $\Delta\rho_n$) of this cycle and the delta resource utilization (e.g., $\Delta\rho_{n-1}$) of the last cycle. For example, the distribution management component 120 can determine whether the delta value is less than the second defined threshold value (e.g., $T_1$), wherein the distribution management component 120 can calculate the delta value as being equal to the delta resource utilization (e.g., $\Delta\rho_{n-1}$) of the last cycle minus the delta resource utilization (e.g., $\Delta\rho_n$) of the current cycle. The second defined threshold value can relate to or indicate whether the delta resource utilization (e.g., $\Delta\rho_n$) associated with this cycle is desirably (e.g., sufficiently) close enough to the delta resource utilization (e.g., $\Delta\rho_{n-1}$) associated with the previous cycle such that performing a target action is desired during this cycle.

In certain implementations, the second defined threshold value (e.g., $T_1$) can be a positive value, which can be determined (e.g., by the distribution management component 120 or another component) based at least in part on the defined distribution management criteria. The distribution management component 120 can determine or calculate the absolute value of the delta resource utilization (e.g., $|\Delta\rho_{n-1}|$) associated with the previous cycle, can determine or calculate the absolute value of the delta resource utilization (e.g., $|\Delta\rho_n|$) associated with this cycle, and can determine the delta value as a function of (e.g., as equal to) the difference between the absolute value of the delta resource utilization associated with the previous cycle and the absolute value of the delta resource utilization associated with this cycle (e.g., delta value=$|\Delta\rho_{n-1}|-|\Delta\rho_n|<T_1$). The distribution management component 120 can compare the delta value to the second defined threshold value to determine whether the delta value satisfies (e.g., is less than) the second defined threshold value.

If the distribution management component 120 determines that the delta value does not satisfy the second defined threshold value, the distribution management component 120 can determine that no target action is to be performed with regard to this cycle. The distribution management component 120 can proceed to the next cycle (e.g., idle-mode cycle or connected-mode cycle, whichever occurs next), and can continue to execute the defined distribution management algorithm (e.g., monitor and/or determine respective resource utilization of respective cells or carriers in the sector 112, determine a desired (e.g., optimal) resource utilization of the cells or carriers in the sector 112, . . . ).

If, instead, response to determining that the delta value satisfies the second defined threshold value, the distribution management component 120 can determine that a target action is to be performed with regard to this cycle. The distribution management component 120 can determine the target action that is to be performed, and can perform or facilitate performing the target action, in accordance with the defined distribution management criteria.

With respect to communication devices that are in idle mode in connection with cells of equal priority in the sector, the target action can comprise, for example, adjusting (e.g., by the distribution management component 120) one or more parameters to facilitate adjusting a ranking of a cell to facilitate adjusting reselection of cells by the communication devices, as more fully described herein. This can facilitate steering communication devices to connect to a target cell or steering communication devices to connect to a source cell. The one or more parameters can comprise, for example, an offset parameter (e.g., a quality offset parameter, such as $Q_{offset\_s,n}$) associated with a neighbor cell that neighbors a serving cell or a hysteresis parameter (e.g., $Q_{hyst,s}$) associated with the serving cell.

With respect to communication devices that are in idle mode in connection with cells of non-equal priority in the sector, the target action can comprise, for example, adjusting (e.g., by the distribution management component 120) one or more parameters to facilitate adjusting reselection of cells by the communication devices, as more fully described herein. The one or more parameters can comprise a defined high threshold value associated with a target cell, a defined low threshold value associated with a target cell, or a defined low threshold serving cell value associated with a serving cell.

With respect to communication devices that are in connected mode, the target action can comprise, for example, executing (e.g., by the distribution management component 120) inter-frequency load balancing (e.g., inter-frequency hand over) to facilitate steering one or more communication devices to another cell (e.g., a desired target cell(s)), and/or adjusting (e.g., by the distribution management component 120) one or more parameters to facilitate steering communication devices to or from a cell (e.g., a source cell) in the sector, as more fully described herein. The one or more parameters can comprise, for example, a first defined threshold value (e.g., a defined threshold value associated with a serving cell), a hysteresis parameter associated with the serving cell, or a second defined threshold value (e.g., a defined threshold value associated with a neighbor cell).

The thresholds (e.g., $T_0$ and $T_1$) employed can be determined (e.g., by the distribution management component 120 or another component) to facilitate controlling sensitivity of the defined distribution management algorithm and mitigating undue or inefficient adjustments to parameters that can potentially result in inefficient management of traffic distribution associated with communication devices and/or resource utilization of cells, in accordance with the defined distribution management criteria. For instance, such thresholds can be determined and set to mitigate, minimize, or eliminate a potential "ping-pong" effect, wherein, during one cycle, a parameter(s) is adjusted in one direction (e.g., to decrease a parameter value), and during another (e.g., next) cycle, the parameter(s) is again adjusted in an opposite direction (e.g., to increase a parameter value).

The disclosed subject matter, by employing the distribution management component 120 to manage traffic distribution and load balancing in a sector 112 or other area of a communication network 108, can enhance efficiency and performance (e.g., device throughput of traffic) of communication devices in the communication network 108, enhance the user experience of communication device users, and improve efficiency and performance (e.g., in terms of resource utilization) of cells (e.g., 114, 116, 118, . . . ) in sectors (e.g., 112) of the communication network 108, as compared to other load balancing techniques. For instance, the disclosed subject matter, by employing the distribution management component 120 to manage traffic distribution and load balancing in a sector 112 or other area of the communication network 108, can enhance (e.g., improve, optimize) UE throughput for an entire sector (e.g., 112) rather than for just individual cells (e.g., 114, 116, or 118, . . . ) of the sector, wherein such enhancement can be desirably more holistic or global than cell-level objectives. From a user's (e.g., consumer's) point of view, any improvement (e.g., improvement in user experience with respect to the communication device of the user and/or improvement in operation and efficiency of the communication device of the user) can be desired regardless of the cell of the sector from which such improvement is achieved (e.g., regardless of whether the communication device is connected to $cell_1$ 114 or $cell_2$ 116), wherein, in accordance with the disclosed subject matter, cell boundaries and constraints from the communication network point of view can be removed, or at least substantially removed, from the user perspectives of communication device users.

The disclosed subject matter (e.g., the distribution management component 120 of the disclosed subject matter), by employing the harmonic mean with respect to UE throughput for cells of the sector (e.g., by determining and employing maximization of the harmonic mean of UE throughput for all cells of the sector 112) as part of an enhancement (e.g., optimization) process, can facilitate pushing or steering more data traffic associated with communication devices from relatively "poor" cells or carriers (e.g., lower-capacity cells or carriers, or cells or carriers having a relatively higher level of congestion) of the sector to relatively "good" cells or carriers (e.g., higher-capacity cells or carriers, or cells or carriers having a relatively lower level of congestion) of the sector 112, in part, since the harmonic mean can be dominated by the minimum of its arguments. This can be desirable not only because it can improve UE performance and UE user experience, but because it can make the entire communication network 108 more efficient in terms of resource utilization of resources of the communication network 108.

It is to be appreciated and understood that, while various aspects and embodiments of the disclosed subject matter have been described with regard to a sector comprising a number (e.g., n) cells, the disclosed subject matter is not so limited. For example, in accordance with the disclosed subject matter, the aspects, techniques, and algorithms disclosed herein can be modified or expanded to apply to, and to manage resource utilization with respect to, desired cells or carriers across multiple base stations or towers, based on (e.g., in accordance with) the defined traffic distribution criteria.

Figure 3:
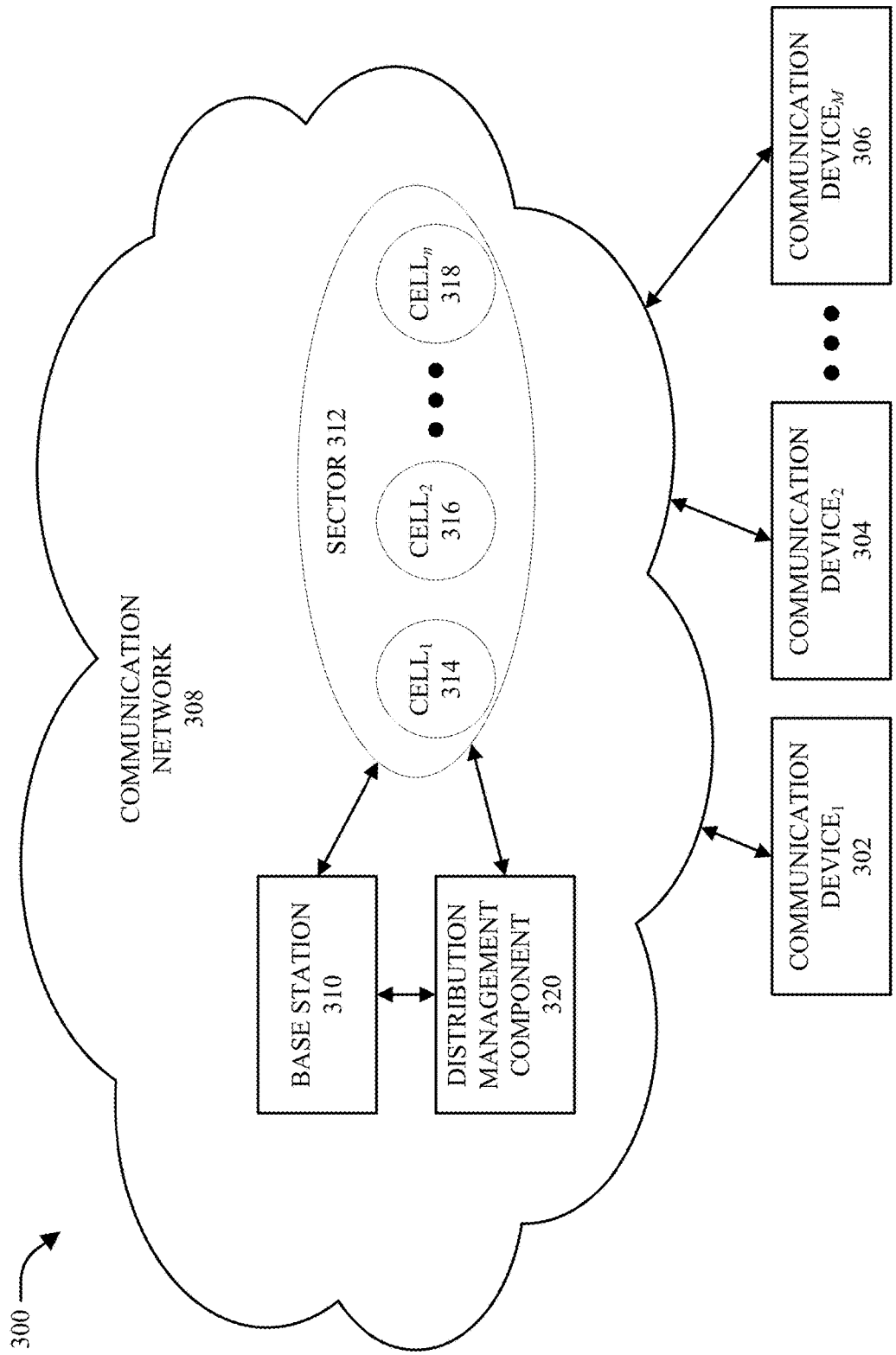
FIG. 3 presents a block diagram of another example system that can facilitate controlling distribution of traffic in a communication network, in accordance with various aspects and embodiments of the disclosed subject matter.

Referring to FIG. 3, FIG. 3 presents a block diagram of another example system 300 that can facilitate controlling distribution of traffic in a communication network, in accordance with various aspects and embodiments of the disclosed subject matter. The system 300 can comprise a set of communication devices, including $communication\ device_1$ 302, $communication\ device_2$ 304, up through $communication\ device_M$ 306, a communication network 308, a base station 310, a sector 312, comprising $cell_1$ 314, $cell_2$ 316, up through $cell_n$ 318, and a distribution management component 320.

In some implementations, the distribution management component 320 can be associated with (e.g., communicatively connected to) the base station 310 (as depicted in FIG. 3) and/or another base station(s) (and associated sector(s)) of the communication network 308. In other implementations, the distribution management component 320 can be part of the base station 310 or another component of or associated with the communication network 308.

The communication network 308 can comprise a macro communication network and/or a micro communication network. The macro communication network can be, can comprise, or can be associated with a core network, a cellular network, an IP-based network, Wi-Fi, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Gi-Fi, Hi-Fi, Bluetooth, ZigBee, etc., and/or can be associated with (e.g., connected to) the macro communication network. The micro communication network can be or can comprise, for example a local area network (LAN), that can facilitate connecting certain devices (e.g., communication devices) associated with the micro communication network to each other and/or to the macro communication network.

Respective communication devices (e.g., 302, 304, 306, . . . ) can be associated with (e.g., communicatively connected to) the communication network 308 via a wireless communication connection or a wireline (e.g., wired) communication connection (e.g., via a cell (e.g., 314, 316, 318, . . . ) and associated base station 310). The respective communication devices (e.g., 302, 304, 306, . . . ) can operate and communicate in a communication network environment. At various times, a communication device (e.g., 302, 304, 306, . . . ) can be communicatively connected via a wireless communication connection(s) to one or more radio access networks (RANs) (not shown), which can comprise one or more base stations (not shown) to communicatively connect the communication device to the communication network 502 to enable the communication device to communicate other communication devices associated with (e.g., communicatively connected to) the communication network 308 in the communication network environment. The RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 308 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 308 (e.g., a core network, cellular network, or a network comprising a core network, cellular network, and/or an IP-based network) can facilitate routing voice and data communications between a communication device(s) (e.g., 302, 304, or 306, . . . ) and another communication device associated with the communication network 308 in the communication network environment. The communication network 308 also can allocate resources to the communication devices in the communication network 308, convert or enforce protocols, establish and enforce quality of service (QOS) for the communication devices, provide applications or services in the communication network 308, translate signals, and/or perform other desired functions to facilitate system interoperability and communication in the communication network 308 (e.g., wireless portion of the communication network 308 or wireline portion of the communication network 308). The communication network 308 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., communication device 302) is moved through a wireless communication network environment, at various times, the communication device(s) can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., communication device functioning as a mobile hotspot)) that can operate in the wireless communication network environment. An AP (e.g., base station 310) can serve a specified coverage area to facilitate communication by the communication device(s) (e.g., 302) or other communication devices in the wireless communication network environment. An AP can serve a respective coverage cell (e.g., macrocell, femtocell, picocell, . . . ) that can cover a respective specified area, and the AP can service mobile wireless devices, such as the communication device(s) (e.g., 302) located in the respective area covered by the respective cell, where such coverage can be achieved via a wireless link (e.g., uplink (UL), downlink (DL)). When an attachment attempt is successful, the communication device(s) (e.g., 302) can be served by the AP and incoming voice and data traffic can be paged and routed to the communication device(s) (e.g., 302) through the AP, and outgoing voice and data traffic from the communication device(s) (e.g., 302) can be paged and routed through the AP to other communication devices in the communication network environment. In an aspect, the communication device(s) (e.g., 302) can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

Figure 4:
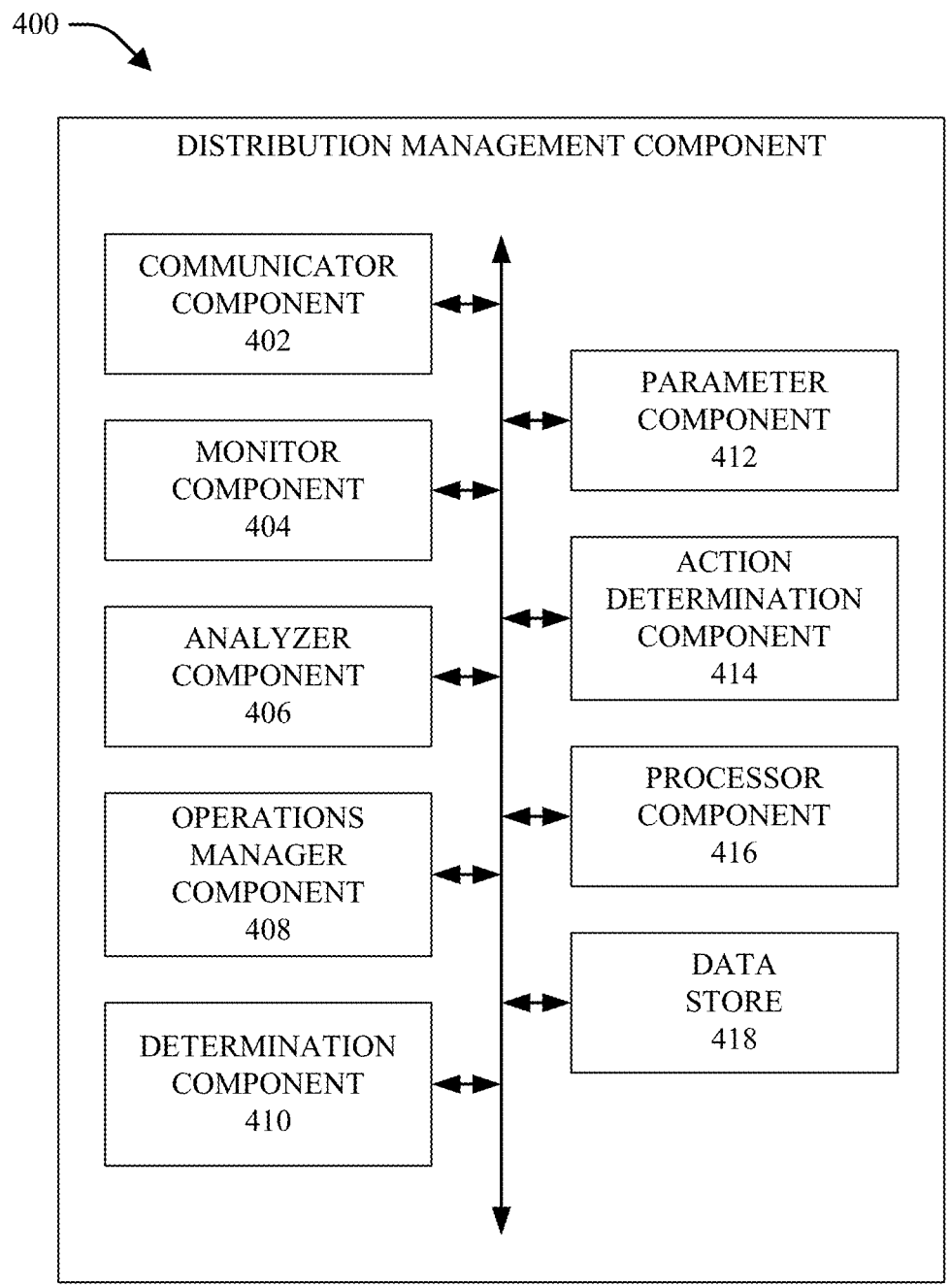
FIG. 4 illustrates a block diagram of an example distribution management component, in accordance with various aspects and embodiments of the disclosed subject matter.

FIG. 4 depicts a block diagram of an example distribution management component 400, in accordance with various aspects and embodiments of the disclosed subject matter. In some embodiments, the distribution management component 400 can be part of or associated with a base station associated with the communication network. The distribution management component 400 can comprise, for example, a communicator component 402, a monitor component 404, an analyzer component 406, an operations manager component 408, a determination component 410, a parameter component 412, an action determination component 414, a processor component 416, and a data store 418.

The communicator component 402 can transmit information from the distribution management component 400 to another component(s) or device(s) (e.g., communication device, network component or device, . . . ) and/or can receive information from the other component(s) or device(s). For instance, the communicator component 402 can receive information relating to respective signal strengths or signal qualities of cells with respect to a communication device, mode-related information (e.g., information indicating a communication device is in an idle mode or a connected mode). The communicator component 402 can transmit commands to have communication devices perform measurements of signal strengths or signal qualities with respect to cells of a sector or other area, and/or can transmit information that can facilitate inter-frequency handover of a communication device from one cell to another cell.

The monitor component 404 can monitor, track, and obtain information relating to traffic communication and distribution associated with respective communication devices and respective cells or carriers of a sector or other area of the communication network, can monitor, track, and obtain information relating to signal strengths and/or signal qualities of cells with respect to respective communication devices, and can monitor track, and obtain information relating to respective resource utilization associated with the respective cells or carriers.

The analyzer component 406 can analyze information and can generate analysis results based at least in part on the results of the analysis. For example, the analyzer component 406 can analyze information relating to resource utilization and/or capacities of cells of a sector to facilitate determining a desired (e.g., optimal, maximal, or suitable) resource utilization for the cells of the sector that satisfies the defined distribution management criteria (e.g., to maximize or desirably enhance the device traffic throughput for the cells that can maximize the harmonic mean or at least satisfy a defined threshold minimum harmonic mean), based at least in part on the results of the analysis. As another example, the analyzer component 406 can analyze information relating to the resource utilization associated with cells of the sector, based at least in part on the analysis results, to facilitate determining whether a target action (e.g., parameter adjustment and/or inter-frequency handover) is to be performed and/or the type of target action (e.g., type of parameter to be adjusted and/or an amount of parameter adjustment) that is to be performed.

The operations manager component 408 can control (e.g., manage) operations associated with the distribution management component 400. For example, the operations manager component 408 can facilitate generating instructions to have components of the distribution management component 400 perform operations, and can communicate respective instructions to respective components (e.g., communicator component 402, monitor component 404, analyzer component 406, . . . ) of the distribution management component 400 to facilitate performance of operations by the respective components of the distribution management component 400 based at least in part on the instructions, in accordance with the defined distribution management criteria and the defined distribution management algorithm(s). The operations manager component 408 also can facilitate controlling data flow between the respective components of the distribution management component 400 and controlling data flow between the distribution management component 400 and another component(s) or device(s) (e.g., communication device, base station or other component or device of the communication network) associated with (e.g., connected to) the distribution management component 400.

The determination component 410 can perform various determinations and calculations based at least in part on analysis results generated by the analyzer component 406 or determination component 410, in accordance with the defined distribution management criteria and the defined distribution management algorithm(s). For example, the determination component 410 can determine or calculate respective resource utilization of respective cells of a sector (e.g., during a cycle) and can determine a desirable (e.g., optimal, maximal, suitable) resource utilization of the respective cells (e.g., in connection with the cycle), based at least in part on the analysis results of relevant information, to facilitate determining whether a target action (e.g., adjustment of a parameter(s) and/or inter-frequency handover of a communication to a cell (e.g., target cell)) is to be performed, in accordance with the defined distribution management criteria.

The parameter component 412 can facilitate determining, setting, or adjusting respective parameter values of respective values, based at least in part on analysis results produced by the analyzer component 406 or determination component 410 and/or determinations rendered by the determination component 410, in accordance with the defined distribution management criteria. For example, in response to a determination being made that a target action is to be performed with respect to communication devices in an idle mode, the parameter component 412 can adjust (e.g., increase or decrease) a desired parameter(s) (e.g., an offset parameter (e.g., $Q_{offset\_s,n}$ parameter), a defined high threshold value (e.g., threshXhigh) associated with a target cell, a defined low threshold value (e.g., threshXlow) associated with a target cell, or a defined low threshold serving cell value (e.g., threshServingLow) associated with a serving cell) to facilitate controlling selection of a cell(s) (e.g., target cell) by a communication device(s) in the idle mode, in accordance with the determined target action.

The action determination component 414 can determine or facilitate determining whether a target action is to be performed with respect to a communication device(s) or sector (or carrier), and, if a target action is to be performed, the type of target action that is to be performed with respect to a communication device(s) or sector (or carrier), in accordance with the defined distribution management criteria, as more fully described herein. The target action employed can facilitate enhancing efficiency and performance (e.g., device throughput of traffic) of communication devices in the communication network, enhancing the user experience of users of communication devices, and improve the efficiency and performance (e.g., in terms of resource utilization) of respective cells of respective sectors of the communication network. A target action can comprise, for example, adjusting one or more parameters associated with a target cell or a serving cell and/or performing an inter-frequency handover of a communication device to a cell (e.g., a target cell), as more fully described herein.

The processor component 416 that can work in conjunction with the other components (e.g., communicator component 402, monitor component 404, analyzer component 406, operations manager component 408, determination component 410, parameter component 412, action determination component 414, data store 418) to facilitate performing the various functions of the distribution management component 400. The processor component 416 can employ one or more processors, microprocessors, or controllers that can process data, such as information relating to traffic and traffic distribution, resource utilization of cells, load balancing of traffic, cell (re)selection, parameters, handovers of communication devices to cells, traffic flows, policies, defined distribution management criteria, algorithms (e.g., defined distribution management algorithm(s)), protocols, interfaces, tools, and/or other information, to facilitate operation of the distribution management component 400, as more fully disclosed herein, and control data flow between the distribution management component 400 and other components (e.g., communication devices, base station, cells, devices of the communication network, data sources, applications) associated with the distribution management component 400.

The data store 418 that can store data structures (e.g., user data, metadata), code structure(s) (e.g., modules, objects, hashes, classes, procedures) or instructions, information relating to traffic and traffic distribution, resource utilization of cells, load balancing of traffic, cell (re)selection, parameters, handovers of communication devices to cells, traffic flows, policies, defined distribution management criteria, algorithms (e.g., defined distribution management algorithm(s)), protocols, interfaces, tools, and/or other information, to facilitate controlling operations associated with the distribution management component 400. In an aspect, the processor component 416 can be functionally coupled (e.g., through a memory bus) to the data store 418 in order to store and retrieve information desired to operate and/or confer functionality, at least in part, to the communicator component 402, monitor component 404, analyzer component 406, operations manager component 408, determination component 410, parameter component 412, action determination component 414, and data store 418, etc., and/or substantially any other operational aspects of the distribution management component 400.

Figure 5:
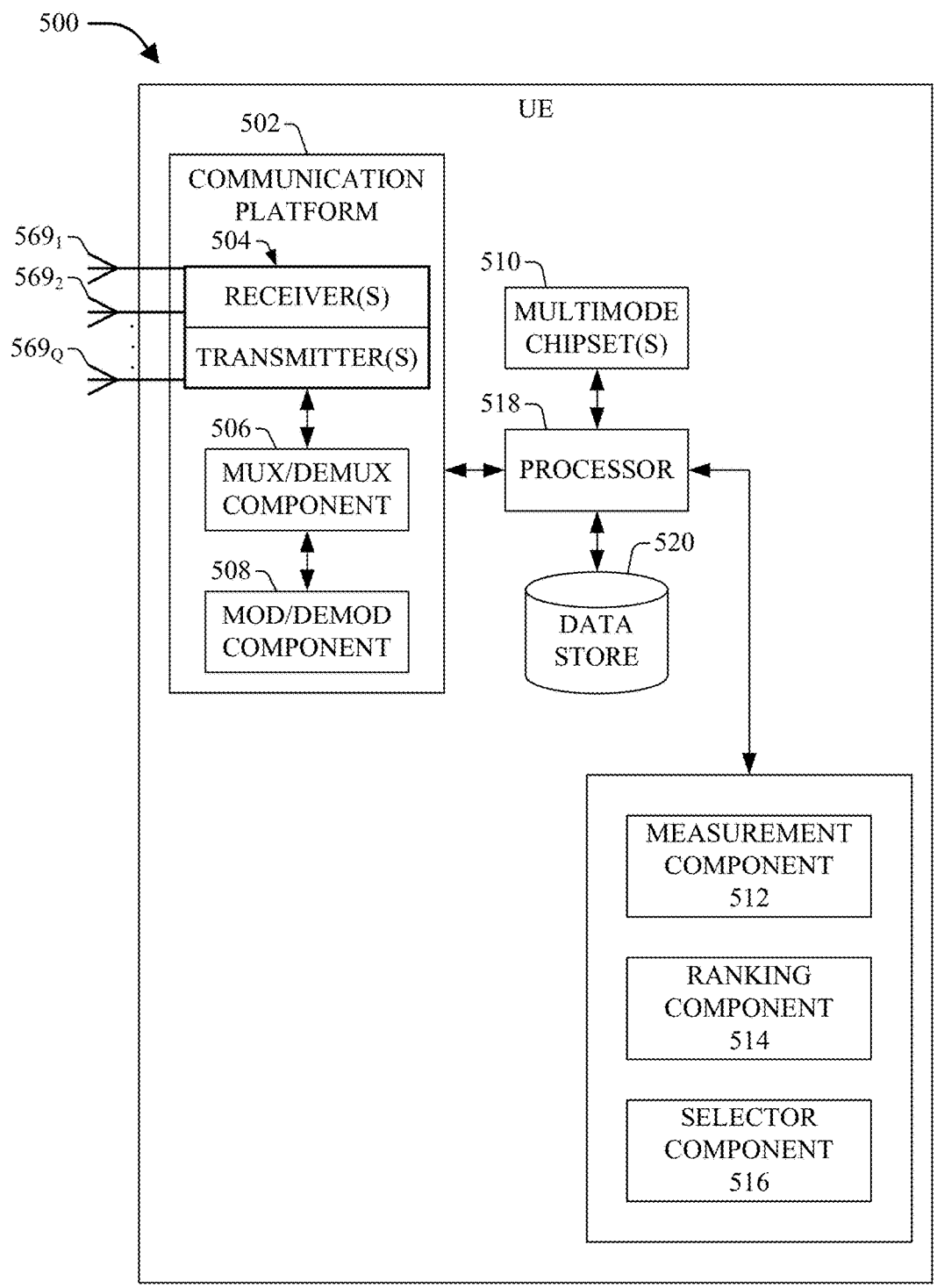
FIG. 5 presents a block diagram of an example user equipment (UE), in accordance with various aspects and embodiments of the disclosed subject matter.

FIG. 5 depicts a block diagram of an example UE 500 in accordance with various aspects and embodiments of the disclosed subject matter. In an aspect, the UE 500 (e.g., communication device) can be a multimode access terminal, wherein a set of antennas $569_1$-$569_Q$ (Q is a positive integer) can receive and transmit signal(s) from and to wireless devices like access points, access terminals, wireless ports and routers, and so forth, that operate in a radio access network. It should be appreciated that antennas $569_1$-$569_Q$ are a part of communication platform 502, which comprises electronic components and associated circuitry that provide for processing and manipulation of received signal(s) and signal(s) to be transmitted; e.g., receivers and transmitters 504, multiplexer/demultiplexer (mux/demux) component 506, and modulation/demodulation (mod/demod) component 508.

In some implementations, the UE 500 can include a multimode operation chipset(s) 510 that can allow the UE 500 to operate in multiple communication modes in accordance with disparate technical specification for wireless technologies. In an aspect, multimode operation chipset(s) 510 can utilize communication platform 502 in accordance with a specific mode of operation (e.g., voice, global positioning system (GPS), . . . ). In another aspect, multimode operation chipset(s) 510 can be scheduled to operate concurrently (e.g., when Q>1) in various modes or within a multitask paradigm.

The UE 500 can comprise a measurement component 512 that can measure signal strengths, signal qualities, and/or other characteristics of the UE 500 with respect to cells of a sector, as more fully described herein. The UE 500, via the communication platform 502, can communicate information relating to the measurements of the signal strengths, signal qualities, and/or other characteristics to the distribution management component, base station, and/or another desired component or device. Such measurements and/or the communication of information relating to such measurements can be performed by the UE 500, for example, in response to a command from the distribution management component, base station, or other component or device associated with the communication network.

The UE 500 also can include a ranking component 514 that can respectively rank cells or carriers of a sector or other defined area of a communication network from highest to lowest based at least in part on one or more parameters (e.g., offset parameter (e.g., $Q_{offset\_s,n}$ parameter)) relating to a source cell or carrier and a neighbor cell(s) or carrier(s)), as more fully described herein. The ranking of cells or carriers by the ranking component 514 can facilitate (re)selection of a cell by the UE 500 to facilitate achieving a desired distribution of traffic in a sector or other defined area, and desired resource utilization by the cells in the sector or other defined area, in accordance with the defined distribution management criteria.

The UE 500 can comprise a selector component 516 that can perform (re)selection to (re)select a cell (e.g., target cell or source cell) to which the UE 500 can be connected based at least in part on the ranking of cells produced by the ranking component 514 (e.g., with regard to cells of equal priority), in accordance with the defined distribution management criteria, as more fully described herein. With regard to cells that are of non-equal priority with respect to each other, the selector component 516 can perform (re)selection to (re)select a cell (e.g., target cell or source cell) to which the UE 500 can be connected based at least in part on the respective signal strengths or signal qualities of respective cells (or carriers) of the sector (or defined area) and related parameters (e.g., a defined high threshold value associated with a target cell, a defined low threshold value associated with a target cell, or a defined low threshold serving cell value associated with a serving cell), in accordance with the defined distribution management criteria, as more fully described herein.

The UE 500 also can include a processor(s) 518 that can be configured to confer functionality, at least in part, to substantially any electronic component within the UE 500, in accordance with aspects of the disclosed subject matter. For example, the processor(s) 518 can facilitate enabling the UE 500 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 518 can facilitate enabling the UE 500 to process data relating to messaging, voice calls, or other services (e.g., Internet services or access, interactive services relating to an information presentation, etc.).

The UE 500 also can contain a data store 520 that can store data structures (e.g., user data, metadata); code structure(s) (e.g., modules, objects, classes, procedures) or instructions; message hashes; neighbor cell list; one or more lists (e.g., whitelist, etc.); information relating to measurements of signal strengths or qualities of cells; information relating to ranking of cells; information relating (re)selection of cells; information relating to parameters (e.g., offset parameter, threshold values, ... ); UE identifier; voice calls, messaging, or other services associated with the UE 500; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 518 can be functionally coupled (e.g., through a memory bus) to the data store 520 in order to store and retrieve information (e.g., neighbor cell list; measurement-related information; ranking-related information; cell (re)selection-related information; information relating to messaging, voice calls, or other services (e.g., interactive services); frequency offsets; desired algorithms; security code; UE identifier; ... ) desired to operate and/or confer functionality, at least in part, to communication platform 502, multimode operation chipset(s) 510, measurement component 512, ranking component 514, selector component 516, and/or substantially any other operational aspects of the UE 500.

Figure 6:
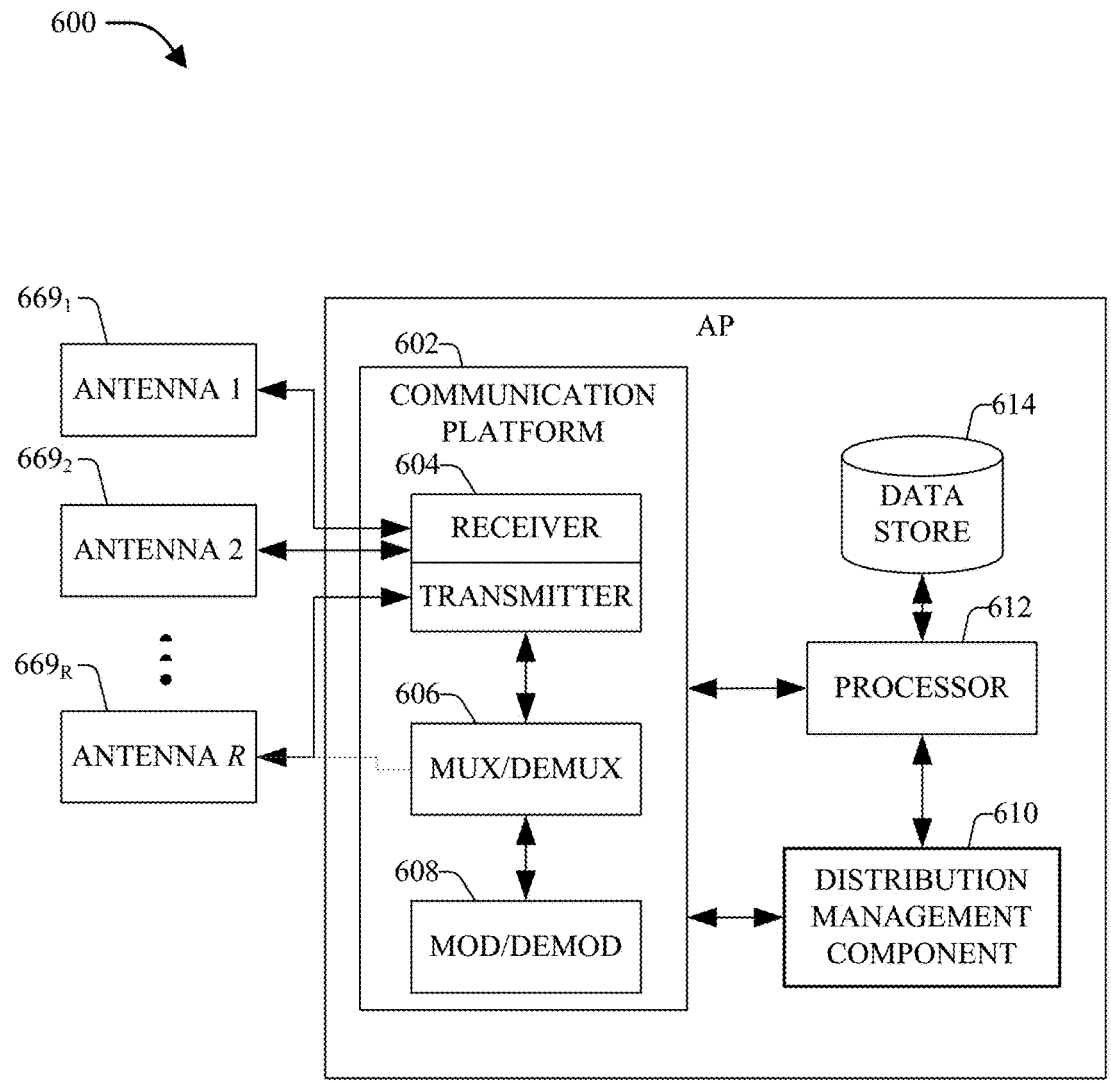
FIG. 6 depicts a block diagram of an example access point (AP), in accordance with various aspects and embodiments of the disclosed subject matter.

FIG. 6 illustrates a block diagram of an example AP 600 (e.g., macro base station, femto AP, pico AP, Wi-Fi AP, Wi-Fi-direct AP, ... ), in accordance with various aspects and embodiments of the disclosed subject matter. The AP 600 can receive and transmit signal(s) from and to wireless devices like access points (e.g., base stations, femtocells, picocells, ... ), access terminals (e.g., UEs), wireless ports and routers, and the like, through a set of antennas $669_1$-$669_R$. In an aspect, the antennas $669_1$-$669_R$ are a part of a communication platform 602, which comprises electronic components and associated circuitry that can provide for processing and manipulation of received signal(s) and signal(s) to be transmitted. In an aspect, the communication platform 602 can include a receiver/transmitter 604 that can convert signal from analog to digital upon reception, and from digital to analog upon transmission. In addition, receiver/transmitter 604 can divide a single data stream into multiple, parallel data streams, or perform the reciprocal operation.

In an aspect, coupled to receiver/transmitter 604 can be a multiplexer/demultiplexer (mux/demux) 606 that can facilitate manipulation of signal in time and frequency space. The mux/demux 606 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 606 can scramble and spread information (e.g., codes) according to substantially any code known in the art, e.g., Hadamard-Walsh codes, Baker codes, Kasami codes, polyphase codes, and so on. A modulator/demodulator (mod/demod) 608 also can be part of the communication platform 602, and can modulate information according to multiple modulation techniques, such as frequency modulation, amplitude modulation (e.g., M-ary quadrature amplitude modulation (QAM), with M a positive integer), phase-shift keying (PSK), and the like.

In some embodiments, the AP 600 optionally can include a distribution management component 610 (e.g., integrated or otherwise associated with the AP 600), that can facilitate desirably controlling and enhancing distribution of traffic associated with communication devices among the cells of the communication network and resource utilization by the cells of the communication network, in accordance with the defined distribution management criteria, as more fully described herein.

The AP 600 also can comprise a processor(s) 612 that can be configured to confer and/or facilitate providing functionality, at least partially, to substantially any electronic component in or associated with the AP 600. For instance, the processor(s) 1212 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 612 also can facilitate other operations on data, for example, to facilitate managing distribution of traffic associated with UEs, resource utilization of cells in a communication network, adjustment of parameters associated with managing traffic distribution and resource utilization, etc.

In another aspect, the AP 600 can include a data store 614 that can store data structures; code instructions; rate coding information; information relating to measurement of radio link quality or reception of information related thereto; information relating to establishing a communications connection between a communication device (e.g., UE) and other communication devices, information relating to traffic distribution among cells and connection of UEs to cells, information relating to resource utilization by cells, information relating to parameters associated with managing traffic distribution and resource utilization, information relating to algorithms (e.g., distribution management algorithm); information relating to distribution management criteria; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 612 can be coupled to the data store 614 in order to store and retrieve information (e.g., information, such as algorithms, relating to multiplexing/demultiplexing or modulation/demodulation, information relating to radio link levels, information relating to establishing communication connections associated with a UE(s) served by the AP 600, information relating to managing distribution of traffic associated with UEs and resource utilization of cells, information relating to the white list, . . . ) desired to operate and/or confer functionality to the communication platform 602, the distribution management component 610, and/or other operational components of AP 600.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
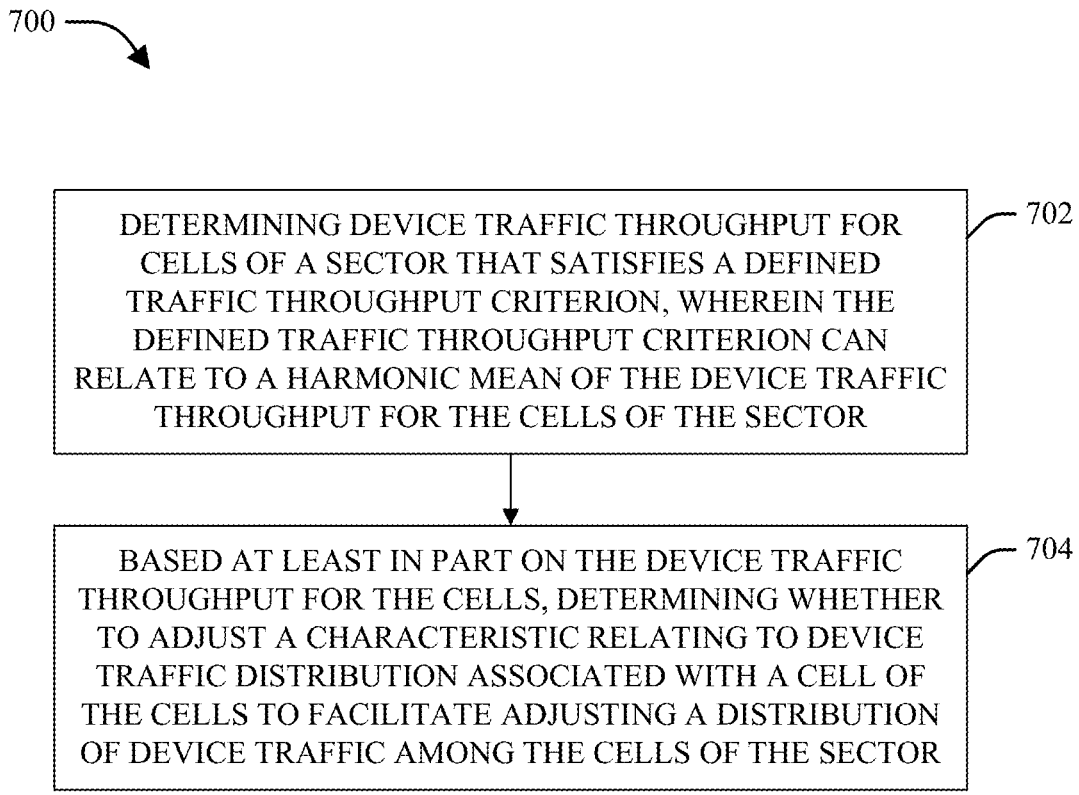
FIG. 7 illustrates a flow chart of an example method 700 can facilitate controlling distribution of traffic in a communication network, in accordance with various aspects and embodiments of the disclosed subject matter.
Figure 8:
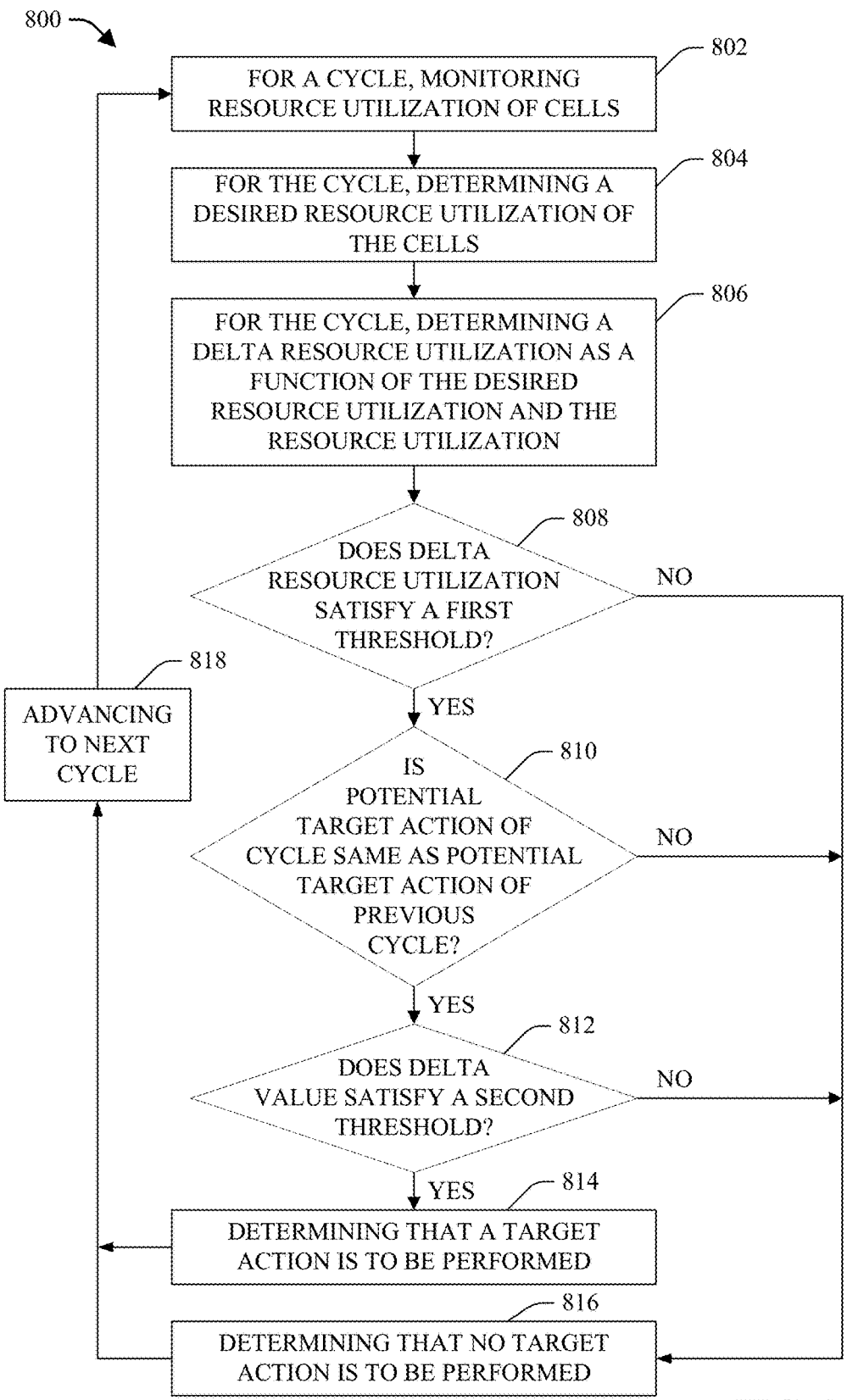
FIG. 8 presents a flow chart of another example method that can facilitate controlling distribution of traffic in a communication network, in accordance with various aspects and embodiments of the disclosed subject matter.

In view of the example systems and/or devices described herein, example methods that can be implemented in accordance with the disclosed subject matter can be further appreciated with reference to flowcharts in FIGS. 7-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can facilitate controlling distribution of traffic in a communication network, in accordance with various aspects and embodiments of the disclosed subject matter. The method 700 can be employed by, for example, a distribution management component of the communication network or a communication device in a sector of the communication network.

At 702, device traffic throughput for cells of a sector that satisfies a defined traffic throughput criterion can be determined, wherein the defined traffic throughput criterion can relate to a harmonic mean of the device traffic throughput for the cells of the sector. The distribution management component can determine or calculate the device traffic throughput for the cells of the sector that satisfies the defined traffic throughput criterion. The defined traffic criterion can relate to the harmonic mean of the device traffic throughput for the cells of the sector that maximizes the harmonic mean or at least satisfies a defined threshold minimum harmonic mean, for example.

At 704, based at least in part on the device traffic throughput for the cells, a determination can be made regarding whether to adjust a characteristic relating to device traffic distribution associated with a cell of the cells to facilitate adjusting a distribution of device traffic among the cells of the sector. The distribution management component can determine whether to adjust the characteristic associated with the cell to facilitate adjusting the distribution of the device traffic among the cells of the sector, based at least in part on the device traffic throughput for the cells. The characteristic can be, for example, a parameter, such as an idle-mode-related parameter or a connected-mode related parameter (e.g., related to load balancing and inter-frequency handover), wherein adjustment of the parameter can facilitate adjusting the distribution of the device traffic among the cells of the sector.

For example, with regard to communication devices in an idle mode and cells of equal priority in the sector, the distribution management component can adjust a parameter (e.g., an offset parameter (e.g., a $Q_{offset\_s,n}$ parameter)) associated with a neighbor cell of the serving cell to facilitate modifying the ranking of the neighbor cell relative to the other cells of the sector to facilitate adjusting cell reselection by communication devices that are in the idle mode. For instance, to facilitate idle mode load balancing control, if the neighbor cell is the target cell, the offset parameter can be decreased to improve the ranking of the target cell as compared to other cells such that more communication devices will select (e.g., reselect) to connect to the target cell, as compared to the original or previous offset parameter setting. As another example, if the neighbor cell is the source cell, the offset parameter can be increased to degrade (e.g., reduce) the ranking of the source cell such that fewer communication devices will reselect to connect to the source cell, as compared to the original or previous offset parameter setting.

With regard to communication devices in an idle mode and cells of non-equal priority in the sector, the distribution management component can adjust one or more parameters to facilitate steering communication devices to or from a source cell and/or to facilitate maintaining communication devices in a target cell, as more fully described herein. The one or more parameters can comprise, for example, a defined high threshold value associated with a target cell, a defined low threshold value associated with a target cell, or a defined low threshold serving cell value associated with a serving cell.

With regard to communication devices in connected mode in the sector, the distribution management component can adjust one or more parameters to facilitate steering communication devices to or from a cell (e.g., a source cell) in the sector, as more fully described herein. The one or more parameters can comprise, for example, a first defined threshold value (e.g., a defined threshold value associated with a serving cell), a hysteresis parameter associated with the serving cell, or a second defined threshold value (e.g., a defined threshold value associated with a neighbor cell).

FIG. 8 presents a flow chart of another example method 800 that can facilitate controlling distribution of traffic in a communication network, in accordance with various aspects and embodiments of the disclosed subject matter. The method 800 can be employed by, for example, a distribution management component of or associated with a system.

At 802, for a cycle, resource utilization of cells can be monitored. For the cycle, the distribution management component can monitor, measure, and/or determine resource utilization of cells or carriers in a sector of a communication network.

At 804, for the cycle, a desired (e.g., optimal, or suitable) resource utilization of the cells can be determined. For the cycle, the distribution management component can determine (e.g., calculate) the desired resource utilization of the cells or carriers in the sector of the communication network. For example, the distribution management component can determine or calculate the desired resource utilization of the cells or carriers in the sector of the communication network that satisfies the defined traffic throughput criterion. The defined traffic criterion can relate to the harmonic mean of the device traffic throughput for the cells of the sector that maximizes the harmonic mean or at least satisfies a defined threshold minimum harmonic mean, for example.

At 806, for the cycle, a delta resource utilization can be determined as a function of the desired resource utilization and the resource utilization (e.g., the monitored or measured resource utilization). For the cycle, the distribution management component can determine (e.g., calculate) the delta resource utilization as a function of the desired resource utilization and the resource utilization. For example, the distribution management component can calculate the delta resource utilization as being equal to the desired resource utilization minus the resource utilization.

At 808, a determination can be made regarding whether the delta resource utilization satisfies a first defined threshold value. The distribution management component can determine whether the delta resource utilization satisfies the first defined threshold value, wherein the first defined threshold value can relate to or indicate a resource utilization that is close enough to the desired resource utilization such that performing a target action is not desired during this cycle.

The first defined threshold value can be a positive value, which can be determined based at least in part on the defined distribution management criteria. The distribution management component can determine or calculate the absolute value of the delta resource utilization, and can compare the absolute value of the delta resource utilization to the first defined threshold value to determine whether the delta resource utilization satisfies (e.g., exceeds) the first defined threshold value.

If, at reference numeral 808, it is determined that the delta resource utilization does not satisfy the first defined threshold value, the method 800 can proceed to reference numeral 816, wherein, at reference numeral 816, it can be determined that no target action is to be performed with regard to this cycle. If the distribution management component determines that the delta resource utilization does not satisfy the first defined threshold value, the distribution management component can determine that no target action is to be performed with regard to this cycle.

Referring again to reference numeral 808, if, at reference numeral 808, it is determined that the delta resource utilization satisfies the first defined threshold value, at 810, a determination can be made regarding whether the potential target action of this cycle is the same as the potential target action of the previous cycle. If the distribution management component determines that the delta resource utilization satisfies the first defined threshold value, the distribution management component can determine whether the potential target action of this cycle is the same as the potential target action of the previous cycle.

For example, the distribution management component can evaluate or compare the sign (e.g., mathematical sign, such as + or −) of the delta resource utilization of this cycle with the sign of the delta resource utilization of the previous cycle. If the sign of the delta resource utilization of this cycle is the same as the sign of the delta resource utilization of the previous cycle, the distribution management component can determine or decide that the potential target action of this cycle is the same as the potential target action of the previous cycle. As a result, the distribution management component can determine that the target action potentially can still be performed if other conditions are satisfied in accordance with the defined distribution management criteria.

If, at reference numeral 810, it is determined that the potential target action of this cycle is not the same as the potential target action of the previous cycle, the method 800 can proceed to reference numeral 816, wherein, at reference numeral 816, it can be determined that no target action is to be performed with regard to this cycle. If the distribution management component determines that the potential target action of this cycle is not the same as the potential target action of the previous cycle, the distribution management component can determine that no target action is to be performed with regard to this cycle.

Referring again to reference numeral 810, if, at reference numeral 810, it is determined that the potential target action of this cycle is the same as the potential target action of the previous cycle, at 812, a determination can be made regarding whether a delta value is less than a second defined threshold value, wherein the delta value is determined as a function of the delta resource utilization associated with the previous cycle and the delta resource utilization associated with this cycle. If the distribution management component determines that the potential target action of this cycle is the same as the potential target action of the previous cycle, the distribution management component can determine that more aggressive action (e.g., adjustment of parameters) may be desirable, in accordance with the defined distribution management criteria, and further evaluation can be performed to facilitate determining whether a target action is to be performed.

For instance, in response to determining that the potential target action of this cycle is the same as the potential target action of the previous cycle, the distribution management component can determine whether the delta value satisfies the second defined threshold value. The second defined threshold value can relate to or indicate whether the delta resource utilization associated with this cycle is desirably (e.g., sufficiently) close enough to the delta resource utilization associated with the previous cycle such that performing a target action is desired during this cycle.

The second defined threshold value can be a positive value, which can be determined based at least in part on the defined distribution management criteria. The distribution management component can determine or calculate the absolute value of the delta resource utilization associated with the previous cycle, can determine or calculate the absolute value of the delta resource utilization associated with this cycle, and can determine the delta value as a function of (e.g., as equal to) the difference between the absolute value of the delta resource utilization associated with the previous cycle and the absolute value of the delta resource utilization associated with this cycle. The distribution management component can compare the delta value to the second defined threshold value to determine whether the delta value satisfies (e.g., is less than) the second defined threshold value.

If, at reference numeral 812, it is determined that the delta value satisfies the second defined threshold value, at 814, it can be determined that the target action is to be performed with regard to this cycle. In response to determining that the delta value satisfies the second defined threshold value (e.g., determining that the difference between the absolute value of the delta resource utilization associated with the previous cycle and the absolute value of the delta resource utilization associated with this cycle satisfies the second defined threshold value), the distribution management component can determine that the target action is to be performed with regard to this cycle. The distribution management component can perform such target action.

With respect to communication devices that are in idle mode in connection with cells of equal priority in the sector, the target action can comprise, for example, adjusting one or more parameters to facilitate adjusting a ranking of a cell to facilitate adjusting reselection of cells by the communication devices, as more fully described herein. This can facilitate steering communication devices to connect to a target cell or steering communication devices to connect to a source cell. The one or more parameters can comprise, for example, an offset parameter (e.g., $Q_{offset\_s,n}$) associated with a neighbor cell that neighbors a serving cell or a hysteresis parameter (e.g., $Q_{hyst,s}$) associated with the serving cell.

With respect to communication devices that are in idle mode in connection with cells of non-equal priority in the sector, the target action can comprise, for example, adjusting one or more parameters to facilitate adjusting reselection of cells by the communication devices, as more fully described herein. The one or more parameters can comprise a defined high threshold value associated with a target cell, a defined low threshold value associated with a target cell, or a defined low threshold serving cell value associated with a serving cell.

With respect to communication devices that are in connected mode, the target action can comprise, for example, executing inter-frequency load balancing (e.g., inter-frequency hand over) to facilitate steering one or more communication devices to another cell (e.g., a desired target cell(s)), and/or adjusting one or more parameters to facilitate steering communication devices to or from a cell (e.g., to a target cell or from a source cell) in the sector, as more fully described herein. The one or more parameters can comprise, for example, a first defined threshold value (e.g., a defined threshold value associated with a serving cell), a hysteresis parameter associated with the serving cell, or a second defined threshold value (e.g., a defined threshold value associated with a neighbor cell).

Referring again to reference numeral 812, if, at reference numeral 812, it is determined that the delta value does not satisfy the second defined threshold value, the method 800 can proceed to reference numeral 816, wherein, at 816, it can be determined that no target action is to be performed with regard to this cycle.

At this point (e.g., from reference numeral 814 or reference numeral 816), the method 800 can proceed to reference numeral 818. At 818, the cycle can be advanced to the next cycle. The next cycle can be associated with communication devices that are in an idle mode or communication devices that are in a connected mode, depending in part on the respective frequencies of the cycles relating to idle mode and connected mode. The method 800 can proceed from reference numeral 818 back to reference numeral 802, wherein the method 800 can proceed onward from reference numeral 802 in connection with that next cycle.

Figure 9:
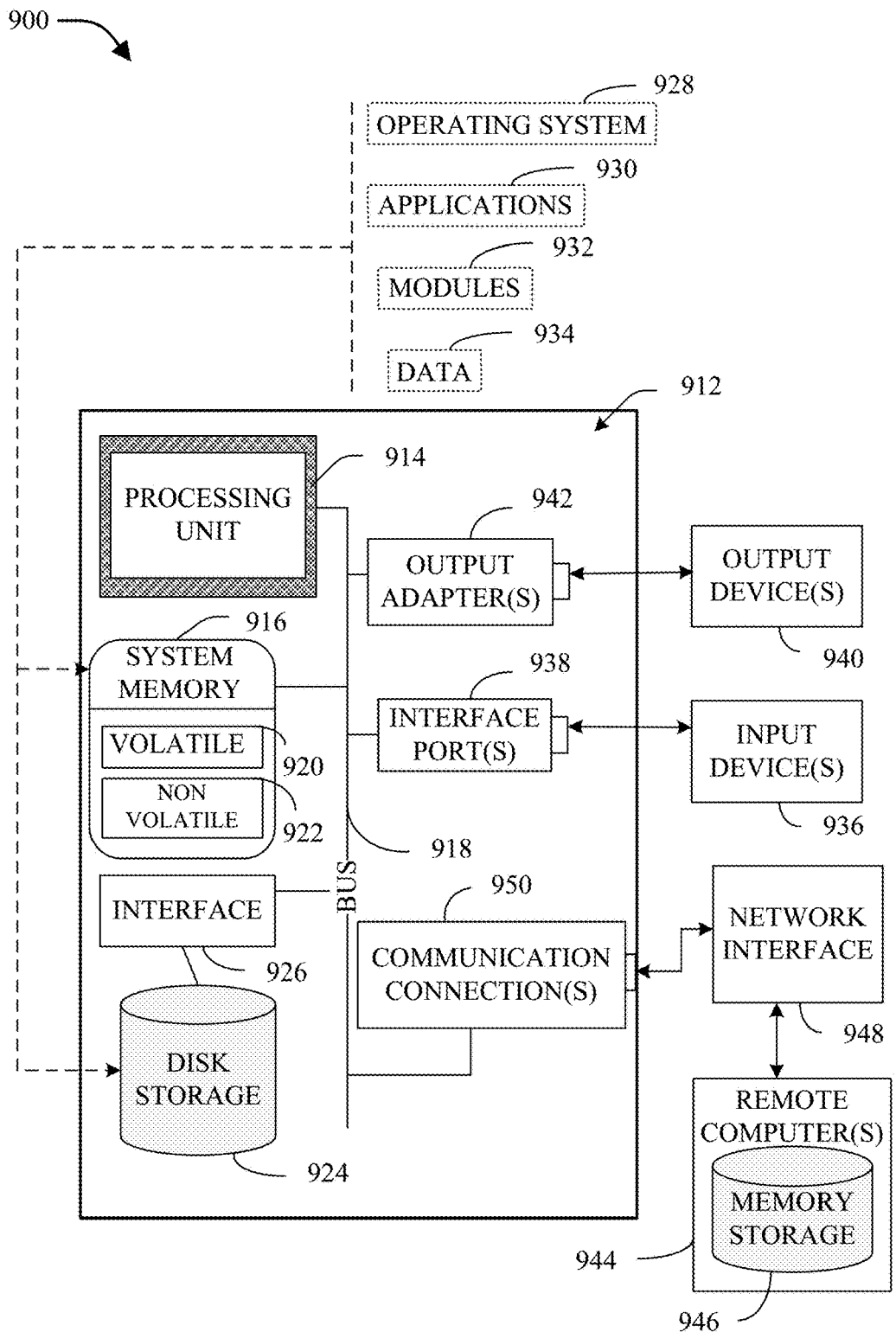
FIG. 9 is a schematic block diagram illustrating a suitable operating environment.
Figure 10:
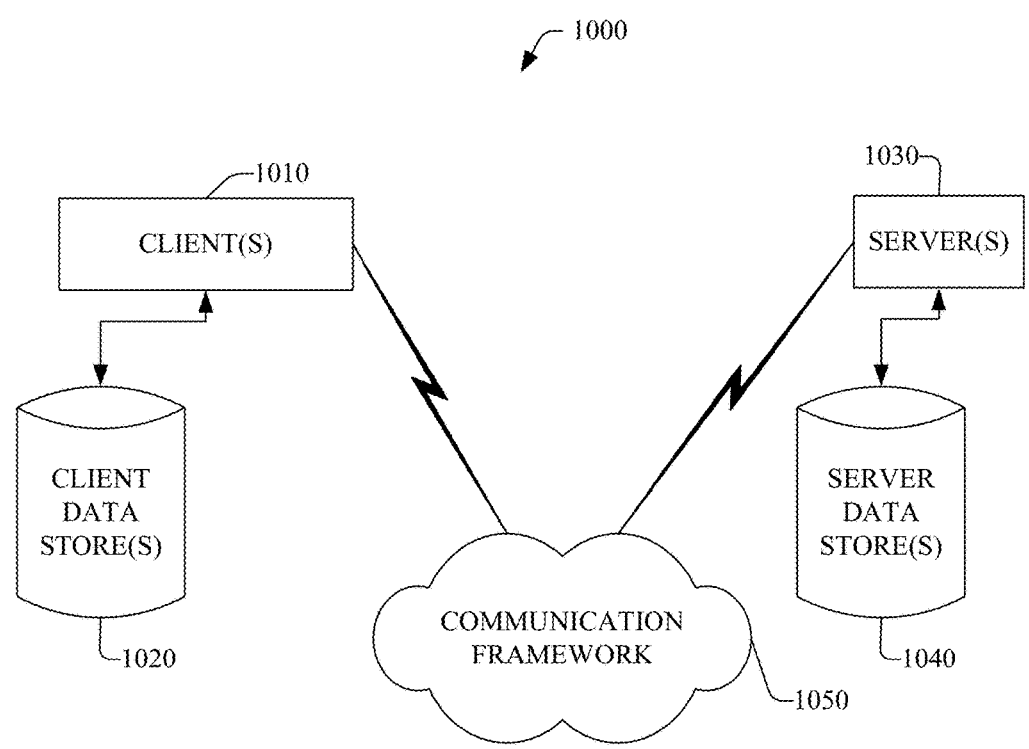
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 9, a suitable environment 900 for implementing various aspects of this disclosure includes a computer 912. The computer 912 includes a processing unit 914, a system memory 916, and a system bus 918. It is to be appreciated that the computer 912 can be used in connection with implementing one or more of the systems, components, or methods shown and described in connection with FIGS.

1-8, or otherwise described herein. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 also includes removable/non-removable, volatile/non-volatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computer system 912. System applications 930 take advantage of the management of resources by operating system 928 through program modules 932 and program data 934 stored, e.g., in system memory 916 or on disk storage 924. It is to be appreciated that this disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 (e.g., computing system) with which the subject matter of this disclosure can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be noted that aspects, features, and/or advantages of the disclosed subject matter can be exploited in substantially any wireless telecommunication or radio technology, e.g., Wi-Fi; Gi-Fi; Hi-Fi; Bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, base station, cell, sector, communication network, distribution management component, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

determining, by a system comprising a processor, an overall device traffic throughput, for cells of a sector associated with a base station device, that satisfies a defined traffic throughput criterion relating to a harmonic mean of the overall device traffic throughput for the cells of the sector, wherein the defined traffic throughput criterion is determined to be satisfied based on the harmonic mean being determined to satisfy a defined threshold value relating to the harmonic mean of the overall device traffic throughput; and based on the overall device traffic throughput for the cells, determining, by the system, whether to adjust an operational characteristic associated with a cell of the cells to facilitate adjusting a distribution of device traffic among the cells of the sector.

2. The method of claim 1, wherein the defined threshold value relating to the harmonic mean is determined based on a maximization of the harmonic mean of the overall device traffic throughput.

3. The method of claim 1, further comprising:
for a cycle, determining, by the system, a utilization of resources of the cells of the sector; and
for the cycle, determining, by the system, a target utilization of the resources of the cells that satisfies the defined traffic throughput criterion.

4. The method of claim 3, wherein the determining whether to adjust the operational characteristic associated with the cell comprises determining whether to adjust the operational characteristic associated with the cell based on the utilization of the resources of the cells and the target utilization of the resources of the cells, to facilitate the adjusting of the distribution of the device traffic among the cells of the sector.

5. The method of claim 3, further comprising:
determining, by the system, a differential value based on a difference between the target utilization of the resources and the utilization of the resources; and
determining, by the system, whether a version of the differential value exceeds a first threshold value relating to a first differential resource utilization value that is a first indicator that facilitates determining whether a target action is to be performed.

6. The method of claim 5, wherein the version of the differential value is a first version of the differential value, and wherein the method further comprises:
in response to determining that the first version of the differential value exceeds the first threshold value, determining, by the system, whether a first potential target action associated with the cycle is same as a second potential target action associated with a previous cycle; and
in response to determining that the first potential target action associated with the cycle is the same as the second potential target action associated with the previous cycle, determining, by the system, whether a value is less than a second threshold value relating to a second differential resource utilization value that is a second indicator that facilitates determining whether the target action is to be performed, wherein the value is determined based on a difference between a second version of the previous differential value and the first version of the differential value.

7. The method of claim 6, further comprising:
in response to determining that the value is less than the second threshold value, determining, by the system, that the first potential target action is the target action that is to be performed to facilitate the adjusting of the distribution of the traffic among the cells of the sector; and
performing, by the system, the target action.

8. The method of claim 1, wherein the operational characteristic associated with the cell is an idle mode parameter associated with the cell in connection with a device in an idle mode of operation, and wherein the method further comprises:
in response to determining that the idle mode parameter associated with the cell is to be adjusted, performing, by the system, a target action that comprises adjusting the idle mode parameter to facilitate the adjusting of the distribution of the device traffic among the cells of the sector.

9. The method of claim 1, wherein the operational characteristic associated with the cell relates to an inter-frequency handover parameter associated with the cell in connection with a device that is in a connected mode of operation, and wherein the method further comprises:
in response to determining that the inter-frequency handover parameter associated with the cell is to be adjusted, performing, by the system, a target action to adjust the inter-frequency handover parameter to facilitate the adjusting of the distribution of the device traffic among the cells of the sector.

10. A system, comprising:
a processor; and
a memory that stores executable instructions that, when executed by the processor, facilitate performance of operations, comprising:
determining an overall device traffic throughput, of cells of a region associated with a base station device, that satisfies a defined traffic throughput criterion relating to a harmonic mean of the overall device traffic throughput of the cells of the region that satisfies a defined threshold value relating to the harmonic mean of the overall device traffic throughput; and
based on the overall device traffic throughput of the cells, determining whether to modify an operational parameter associated with a cell of the cells to facilitate modifying a distribution of device traffic among the cells of the region to facilitate traffic load balancing among the cells.

11. The system of claim 10, wherein the defined threshold value relating to the harmonic mean of the overall device traffic throughput is determined as a function of a maximum harmonic mean associated with the overall device traffic throughput.

12. The system of claim 10, wherein the operations comprise:
with regard to a cycle, determining a utilization of radio resources of the cells of the region; and
with regard to the cycle, determining a target utilization of the radio resources of the cells that satisfies the defined traffic throughput criterion.

13. The system of claim 12, wherein the determining whether to modify the operational parameter associated with the cell comprises determining whether to modify the operational parameter associated with the cell based on the utilization of the radio resources of the cells and the target utilization of the radio resources of the cells, to facilitate the modifying of the distribution of the device traffic among the cells of the region.

14. The system of claim 12, wherein the operations comprise:
determining a net value based on a difference between the target utilization of the radio resources and the utilization of the radio resources; and
determining whether a version of the net value exceeds a first threshold value relating to a first differential radio resource utilization value that is a first indicator that facilitates a determination regarding whether a target action is to be executed.

15. The system of claim 14, wherein the version of the net value is a first version of the net value, and wherein the operations comprise:
based on determining that the first version of the net value exceeds the first threshold value, determining whether a first potential target action associated with the cycle is same as a second potential target action associated with a previous cycle; and based on determining that the first potential target action associated with the cycle is the same as the second potential target action associated with the previous cycle, determining whether a value is less than a second threshold value relating to a second differential radio resource utilization value that is a second indicator that facilitates the determination regarding whether the target action is to be executed, wherein the value is determined based on a difference between a second version of the previous net value and the first version of the net value.

16. The system of claim 15, wherein the operations comprise:

in response to determining that the value is less than the second threshold value, determining that the first potential target action is the target action that is to be executed to facilitate the modifying of the distribution of the traffic among the cells of the region; and executing the target action to facilitate the traffic load balancing among the cells.

17. The system of claim 10, wherein the operational parameter associated with the cell is an idle mode parameter associated with the cell in connection with a device operating in an idle mode, and wherein the operations comprise:

in response to determining that the idle mode parameter associated with the cell is to be modified, executing a target action that modifies the idle mode parameter associated with the cell to facilitate the modifying of the distribution of the device traffic among the cells of the region.

18. The system of claim 10, wherein the operational parameter associated with the cell relates to an inter-frequency handover parameter associated with the cell in connection with a device that is in a connected mode of operation, and wherein the operations comprise:

in response to determining that the inter-frequency handover parameter associated with the cell is to be modified, executing a target action that modifies the inter-frequency handover parameter to facilitate the modifying of the distribution of the device traffic among the cells of the region.

19. A machine-readable storage medium, comprising executable instructions that, when executed by a processor, facilitate performance of operations, comprising:

determining an overall device traffic throughput, of cells of a sector associated with a base station device, that satisfies a defined traffic throughput criterion relating to a harmonic mean of the overall device traffic throughput of the cells of the sector that satisfies a defined threshold value relating to the harmonic mean of the overall device traffic throughput; and based on the overall device traffic throughput of the cells, determining whether to adjust an operating parameter associated with a cell of the cells to facilitate adjusting an apportionment of device traffic among the cells of the sector.

20. The machine-readable storage medium of claim 19, wherein the operations further comprise:

with regard to a cycle, determining a utilization of resources of the cells of the sector; and with regard to the cycle, determining a target utilization of the resources of the cells that satisfies the defined traffic throughput criterion, wherein the determining whether to adjust the operating parameter associated with the cell comprises determining whether to adjust the operating parameter associated with the cell as a function of the utilization of the resources of the cells and the target utilization of the resources of the cells, to facilitate the adjusting of the apportionment of the device traffic among the cells of the sector.

* * * * *